(12) United States Patent
Matsuura et al.

(10) Patent No.: US 12,741,880 B2
(45) Date of Patent: Sep. 22, 2026

(54) METHOD AND APPARATUS FOR PRODUCING CARBONATE SALTS

(71) Applicant: NanoMist Technologies Co., Ltd., Tokushima (JP)

(72) Inventors: Kazuo Matsuura, Tokushima (JP); Toshiharu Chichibu, Tokyo (JP); Tomoyoshi Nomura, Tokyo (JP); Yuji Adachi, Tokyo (JP); Soichiro Shimada, Tokyo (JP); Shingo Tomemori, Tokyo (JP)

(73) Assignee: NANOMIST TECHNOLOGIES CO., LTD., Tokushima (JP)

( * ) Notice: Subject to any disclaimer, the term of this patent is extended or adjusted under 35 U.S.C. 154(b) by 691 days.

(21) Appl. No.: 18/015,635

(22) PCT Filed: Jul. 13, 2021

(86) PCT No.: PCT/JP2021/026218
§ 371 (c)(1),
(2) Date: Jan. 11, 2023

(87) PCT Pub. No.: WO2022/014554
PCT Pub. Date: Jan. 20, 2022

(65) Prior Publication Data

US 2023/0242410 A1 Aug. 3, 2023

(30) Foreign Application Priority Data

Jul. 13, 2020 (JP) ................................ 2020-120179

(51) Int. Cl.
*C01F 11/18* (2006.01)
*B01D 19/00* (2006.01)
(Continued)

(52) U.S. Cl.
CPC ........ *C01F 11/181* (2013.01); *B01D 19/0057* (2013.01); *B01D 53/145* (2013.01);
(Continued)

(58) Field of Classification Search
None
See application file for complete search history.

(56) References Cited

U.S. PATENT DOCUMENTS

2007/0163443 A1 7/2007 Moriyama et al.
2011/0147482 A1 6/2011 Matsuura
2019/0160395 A1* 5/2019 Saini .................... B01D 17/045

FOREIGN PATENT DOCUMENTS

CN 208042810 U * 11/2018 ................ F28B 3/00
JP 2002-293537 10/2002
(Continued)

OTHER PUBLICATIONS

International Search Report issued Sep. 14, 2021 in International Application No. PCT/JP2021/026218, with English translation.

*Primary Examiner* — Daniel Berns
(74) *Attorney, Agent, or Firm* — Wenderoth, Lind & Ponack, L.L.P.

(57) ABSTRACT

Carbonate salts are efficiently produced from carbon dioxide in exhaust gas. The method for producing carbonate salts includes an atomizing step that forms an aqueous alkaline solution mist with an atomizer; a mixing step that mixes exhaust gas with the aqueous alkaline solution mist produced in the atomizing step to absorb exhaust gas carbon dioxide in the mist and combine mist positive ions with the carbon dioxide to produce mist that contains carbonate salt; and a separating step that separates the mist that contains carbonate salt produced in the mixing step from exhaust gas.

9 Claims, 12 Drawing Sheets

(51) Int. Cl.
*B01D 53/14* (2006.01)
*B03C 3/017* (2006.01)
*B03C 3/019* (2006.01)
*C01D 7/07* (2006.01)

(52) U.S. Cl.
CPC ..... *B01D 53/1475* (2013.01); *B01D 53/1481* (2013.01); *B01D 53/1493* (2013.01); *B03C 3/017* (2013.01); *B03C 3/019* (2013.01); *C01D 7/07* (2013.01); *B01D 2252/1035* (2013.01)

(56) References Cited

FOREIGN PATENT DOCUMENTS

| | | | |
|---|---|---|---|
| JP | 2005-211826 | 8/2005 | |
| JP | 2009-172596 | 8/2009 | |
| JP | 2011-131140 | 7/2011 | |
| JP | 6402274 B1 * | 10/2018 | ............ B01D 53/18 |
| JP | 2019-171255 | 10/2019 | |
| WO | 2014/006742 | 1/2014 | |

* cited by examiner 100
4
3
PM PRE-PROCESSING UNIT
2
ATMOSPHERIC POLLUTANT PRE-PROCESSING UNIT
EXHAUST GAS (PM,SOx,NOx,$CO_2$)
PM
SOx, NOx
6(6A)
28
27
7(70)
EXHAUST GAS
75
74
$Na_2CO_3$
76
P
$Ca(OH)_2$
REACTING CHAMBER
80
DRIER
82
$CaCO_3$
20
F
CARRIER GAS
1
ATOMIZER
29
F
MIST-AND-GAS MIXTURE
AQUEOUS ALKALINE SOLUTION (NaOH)
CONTROLLER
5

EXHAUST GAS
75
70(7)
73
71
MIST-AND-EXHAUST
GAS MIXTURE
72
74
MIST

2
EXHAUST GAS
(SOx NOx $CO_2$)
2A
2B
6A(6)
27
28
7(70)
SOx
NOx
8
OXIDIZING UNIT
$NO_1 \rightarrow NO_2$
OUTSIDE AIR
F
24
29
EXHAUST GAS
($CO_2$)
CONTROLLER
5
ATOMIZER
1
20

200
4
3
2
PM PRE-PROCESSING UNIT
ATMOSPHERIC POLLUTANT PRE-PROCESSING UNIT
EXHAUST GAS ($PM,SO_x,NO_x,CO_2$)
PM
$SO_x$, $NO_x$
6(6A)
28
27
7(70)
EXHAUST GAS
75
$Ca(OH)_2$
REACTING CHAMBER
80
DRIER
82
$CaCO_3$
20
1(6)
29
F
ATOMIZER
F
CARRIER GAS
MIST-AND-EXHAUST GAS MIXTURE
AQUEOUS ALKALINE SOLUTION (NaOH)
CONTROLLER
5
74
$Na_2CO_3$
76
P

1B(1)
62
47
64
61
63
50
42
41
43
HIGH VOLTAGE POWER SUPPLY
66
67
F
P
65
9
CARRIER GAS
CONTROLLER
5

METHOD AND APPARATUS FOR PRODUCING CARBONATE SALTS

CROSS-REFERENCE TO RELATED APPLICATIONS

The present application is a national phase application of PCT Application No. PCT/JP2021/026218, filed on Jul. 13, 2021, and claims priority under 35 U.S.C. § 119 to Japanese Patent Application No. 2020-120179, filed on Jul. 13, 2020, the contents of which are incorporated herein by references in their entirety.

BACKGROUND

The present invention relates to a method and apparatus for producing carbonate salts from carbon dioxide included in exhaust gas as raw material.

A method for producing calcium carbonate using exhaust gas as raw material has been developed (JP2002-293537A, e.g.). The method disclosed uses gas-liquid contact to absorb carbon dioxide in exhaust gas (e.g. combustion furnace exhaust gas) in caustic soda (sodium hydroxide) solution to form sodium carbonate solution, uses an aqueous solution of sodium hydroxide to hydrate unslaked lime to form lime milk, and produces calcium carbonate by reacting the lime milk with the sodium carbonate solution.

The method described above employs gas-liquid contact procedure to introduce exhaust gas into sodium hydroxide solution and react carbon dioxide in the exhaust gas with sodium hydroxide in the sodium hydroxide solution to produce sodium carbonate. Using this gas-liquid contact procedure, it is difficult to efficiently produce sodium carbonate by reacting exhaust gas carbon dioxide with sodium hydroxide.

The present invention was developed with the object of eliminating this drawback. Thus it is an important object of the present invention to provide a method and apparatus for producing carbonate salts that can efficiently produce carbonate salts from exhaust gas carbon dioxide as raw material.

SUMMARY

An implementation of the method for producing carbonate salts of the present invention includes an atomizing step that forms an aqueous alkaline solution mist with an atomizer; a mixing step that mixes exhaust gas with the aqueous alkaline solution mist produced in the atomizing step to absorb exhaust gas carbon dioxide in the mist and combine mist positive ions with the carbon dioxide to form mist that contains carbonate salt; and a separating step that separates the mist that contains carbonate salt produced in the mixing step from exhaust gas.

An implementation of the apparatus for producing carbonate salts of the present invention is provided with an atomizer that atomizes aqueous alkaline solution to form mist; a mixer that mixes exhaust gas with the mist generated by the atomizer to combine positive ions in the mist with carbon dioxide and form carbonate salt; and a separator that separates exhaust gas from the mixer mist to retrieve mist that contains carbonate salt.

The method and apparatus described above have the characteristic that carbonate salts can be efficiently produced from the carbon dioxide in exhaust gas.

DESCRIPTION

Figure 1:
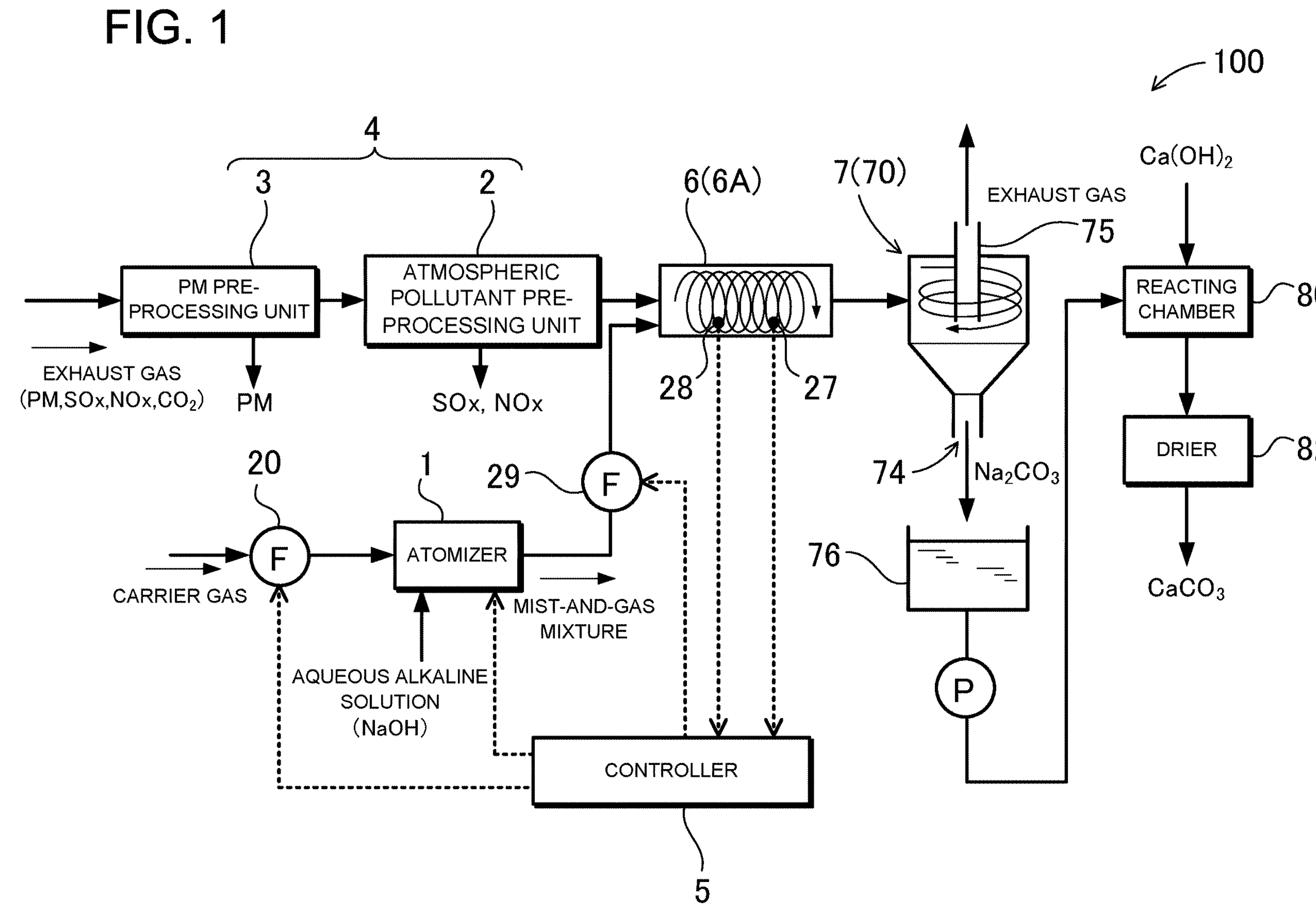
FIG. 1 is a schematic diagram of the carbonate salt manufacturing apparatus for the first embodiment of the present invention.

The following describes the present invention in detail based on the figures. Although terms indicating specific direction and/or position (e.g. above, below, and terminology that includes those types of words) are used as required In the following descriptions, use of those terms is for the purpose of making the invention easy to understand with reference to the figures and the technical scope of the present invention is not limited based on the meaning of those terms. Further, components that appear in a plurality of figures with the same reference number (sign) indicate components or materials that are the same or equivalent. The following implementations and embodiments are merely specific examples of the technology associated with the invention, and the present invention is not limited to the implementations and embodiments described below. In the absence of specific annotation, structural component features described in the following such as dimensions, raw material, shape, and relative position are simply for the purpose of explicative example and are not intended to limit the scope of the invention. Descriptive contents relating to one implementation or embodiment may also be applied to describe other implementations or embodiments. Further, properties such as the size and spatial relation of components shown in the figures may be exaggerated for the purpose of clear explanation.

The 1$^{st}$ aspect of the method for producing carbonate salts of the present invention includes an atomizing step that forms an aqueous alkaline solution mist with an atomizer; a mixing step that mixes exhaust gas with the aqueous alkaline solution mist produced in the atomizing step to absorb exhaust gas carbon dioxide in the mist and combine mist positive ions with the carbon dioxide to form mist that contains carbonate salt; and a separating step that separates the mist that contains carbonate salt produced in the mixing step from exhaust gas.

In the $2^{nd}$ aspect of the method for producing carbonate salts of the present invention, the atomizer ultrasonically vibrates the aqueous alkaline solution to form mist in the atomizing step.

In the $3^{rd}$ aspect of the method for producing carbonate salts of the present invention, the atomizer ultrasonically vibrates the aqueous alkaline solution in the atomizing step to form a column of liquid that protrudes from the liquid surface, and blows exhaust gas over the surface of the liquid column to mix the mist and exhaust gas.

In the $4^{th}$ aspect of the method for producing carbonate salts of the present invention, the atomizer ultrasonically vibrates the aqueous alkaline solution in the atomizing step to form a column of liquid that protrudes from the liquid surface, blows a carrier gas over the surface of the liquid column to form a mist-and-gas mixture, and mixes that mist-gas mixture with exhaust gas in the mixing step.

In the $5^{th}$ aspect of the method for producing carbonate salts of the present invention, the atomizer ejects aqueous alkaline solution spray from a nozzle and atomizes that spray via static electricity to form mist in the atomizing step.

In the $6^{th}$ aspect of the method for producing carbonate salts of the present invention, the atomizer blows exhaust gas into the static electricity atomized nozzle spray mist to mix the mist and exhaust gas in the atomizing step.

In the $7^{th}$ aspect of the method for producing carbonate salts of the present invention, the atomizer blows a carrier gas into the static electricity atomized nozzle spray mist to form a mist-and-gas mixture, and mixes that mist-gas mixture with exhaust gas in the mixing step.

In the $8^{th}$ aspect of the method for producing carbonate salts of the present invention, the average diameter of the aqueous alkaline solution mist in the atomizing step is less than or equal to 50 μm. Further, in the $9^{th}$ aspect of the method for producing carbonate salts of the present invention, the average diameter of the aqueous alkaline solution mist in the atomizing step is less than or equal to 30 μm.

In the $10^{th}$ aspect of the method for producing carbonate salts of the present invention, the average diameter of the aqueous alkaline solution mist in the atomizing step is greater than or equal to 100 nm.

In the $11^{th}$ aspect of the method for producing carbonate salts of the present invention, caustic soda (sodium hydroxide) solution is used as the aqueous alkaline solution in the atomizing step, carbon dioxide in exhaust gas is reacted with the sodium hydroxide solution mist in the mixing step to produce mist containing sodium carbonate, and the mist that contains sodium carbonate is separated from the exhaust gas in the separating step.

The $12^{th}$ aspect of the method for producing carbonate salts of the present invention includes a reacting step that reacts sodium carbonate solution obtained in the separating step with an aqueous solution of calcium hydroxide to produce calcium carbonate.

The $13^{th}$ aspect of the method for producing carbonate salts of the present invention mixes sodium carbonate solution with calcium hydroxide to react sodium carbonate and calcium hydroxide to produce calcium carbonate in the reacting step, and includes a drying step that separates and dries calcium carbonate precipitate obtained in the reacting step.

In the $14^{th}$ aspect of the method for producing carbonate salts of the present invention, mist that contains carbonate salt is separated from exhaust gas by a cyclone separator in the separating step.

In the $15^{th}$ aspect of the method for producing carbonate salts of the present invention, caustic soda (sodium hydroxide) solution produced from sea-water as raw material is used as the aqueous alkaline solution in the atomizing step.

In the $16^{th}$ aspect of the method for producing carbonate salts of the present invention, aqueous alkaline solution mist is mixed with exhaust gas using a static mixer in the mixing step.

In the $17^{th}$ aspect of the method for producing carbonate salts of the present invention, aqueous alkaline solution mist is mixed with exhaust gas with a mixer in the mixing step, and temperature in the mixer is maintained at or below the dew point.

The $18^{th}$ aspect of the method for producing carbonate salts of the present invention includes a pre-processing step that separates atmospheric pollutants from the exhaust gas and uses carbon dioxide in the atmospheric pollutant removed exhaust gas as raw material to produce carbonate salts.

The $19^{th}$ aspect of the method for producing carbonate salts of the present invention further includes a pre-processing step that removes particulate matter included in the exhaust gas and uses carbon dioxide in the particulate matter removed exhaust gas as raw material to produce carbonate salts.

In the $20^{th}$ aspect of the method for producing carbonate salts of the present invention, the aqueous alkaline solution is an aqueous solution that includes alkaline metals or alkaline earth metals, or the aqueous alkaline solution is natural material or waste material that contains alkaline metals or alkaline earth metals dissolved in water.

The $21^{st}$ aspect of the apparatus for producing carbonate salts of the present invention is provided with an atomizer that atomizes aqueous alkaline solution to form mist; a mixer that mixes exhaust gas with the mist generated by the atomizer to combine positive ions in the mist with carbon dioxide and form carbonate salt; and a separator that separates exhaust gas from the mixer mist to retrieve mist that contains carbonate salt.

In the $22^{nd}$ aspect of the apparatus for producing carbonate salts of the present invention, the atomizer is an ultrasonic atomizer that ultrasonically vibrates the aqueous alkaline solution to form mist.

The $23^{rd}$ aspect of the apparatus for producing carbonate salts of the present invention is provided with a blower mechanism, wherein the ultrasonic atomizer vibrates the aqueous alkaline solution to establish a liquid column that protrudes from the surface of the aqueous alkaline solution, and the blower mechanism blows exhaust gas over the liquid column to mix mist and exhaust gas.

The $24^{th}$ aspect of the apparatus for producing carbonate salts of the present invention is provided with a blower mechanism, wherein the ultrasonic atomizer vibrates the aqueous alkaline solution to establish a liquid column that protrudes from the surface of the aqueous alkaline solution, the blower mechanism blows a carrier gas over the surface of the liquid column to form a mist-and-gas mixture, and the mixer mixes that mist-gas mixture with exhaust gas.

In the $25^{th}$ aspect of the apparatus for producing carbonate salts of the present invention, the atomizer is a static electricity atomizer that electro-statically atomizes aqueous alkaline solution sprayed from nozzles to form mist.

The $26^{th}$ aspect of the apparatus for producing carbonate salts of the present invention is provided with a blower mechanism that blows exhaust gas into the mist electro-statically atomized by the static electricity atomizer to mix exhaust gas with the mist.

The $27^{th}$ aspect of the apparatus for producing carbonate salts of the present invention is provided with a blower mechanism that blows a carrier gas into the mist electrostatically atomized by the static electricity atomizer to form a mist-and-gas mixture, and the mixer mixes that mist-gas mixture with exhaust gas.

In the $28^{th}$ aspect of the apparatus for producing carbonate salts of the present invention, the atomizer produces aqueous alkaline solution mist with an average diameter less than or equal to 50 μm. Further, in the $29^{th}$ aspect of the apparatus for producing carbonate salts of the present invention, the atomizer produces aqueous alkaline solution mist with an average diameter less than or equal to 30 μm.

In the $30^{th}$ aspect of the apparatus for producing carbonate salts of the present invention, the atomizer produces aqueous alkaline solution mist with an average diameter greater than or equal to 100 nm.

In the $31^{st}$ aspect of the apparatus for producing carbonate salts of the present invention, the aqueous alkaline solution used by the atomizer to form mist is caustic soda (sodium hydroxide) solution, and the mixer induces reaction of the sodium hydroxide solution mist with carbon dioxide in the exhaust gas to form sodium carbonate.

The $32^{nd}$ aspect of the apparatus for producing carbonate salts of the present invention is provided with a chemical reactor wherein sodium carbonate solution from the separator is reacted with calcium hydroxide to form calcium carbonate.

The $33^{rd}$ aspect of the apparatus for producing carbonate salts of the present invention is provided with a dryer that dries calcium carbonate formed in the chemical reactor, the chemical reactor is provided with a mixing camber where sodium carbonate is mixed with calcium hydroxide to react the sodium carbonate and calcium hydroxide and precipitate calcium carbonate, and the dryer dries the calcium carbonate obtained in the mixing camber to produce calcium carbonate in granular (powder) form.

In the $34^{th}$ aspect of the apparatus for producing carbonate salts of the present invention, the separator is a cyclone separator.

In the $35^{th}$ aspect of the apparatus for producing carbonate salts of the present invention, the aqueous alkaline solution atomized to form mist by the atomizer is caustic soda (sodium hydroxide) solution produced from sea-water as raw material.

In the $36^{th}$ aspect of the apparatus for producing carbonate salts of the present invention, the aqueous alkaline solution atomized to form mist by the atomizer is an aqueous solution that includes alkaline metals or alkaline earth metals, or the aqueous alkaline solution is natural material or waste material that contains alkaline metals or alkaline earth metals dissolved in water.

In the $37^{th}$ aspect of the apparatus for producing carbonate salts of the present invention, the mixer is a static mixer.

The $38^{th}$ aspect of the apparatus for producing carbonate salts of the present invention is provided with a pre-processing unit that separates $SO_x$ and $NO_x$ atmospheric pollutants from the exhaust gas.

The $39^{th}$ aspect of the apparatus for producing carbonate salts of the present invention is provided with a pre-processing unit that removes particulate matter included in the exhaust gas.

First Embodiment

FIG. 1 is a block diagram of manufacturing apparatus that uses, as raw material, carbon dioxide included in exhaust gas emitted from an industrial facility and/or equipment such as a power plant or blast furnace. The manufacturing apparatus in this figure produces calcium carbonate as the manufactured carbonate salt. The apparatus forms sodium carbonate using carbon dioxide in exhaust gas as raw material, and produces calcium carbonate by reacting sodium carbonate with calcium hydroxide. The calcium carbonate produced by this manufacturing apparatus has a higher commercial value than sodium carbonate and has the characteristic that it can be effectively used in various applications. After forming sodium carbonate from the carbon dioxide in exhaust gas, the apparatus forms calcium carbonate by reacting calcium hydroxide with the sodium carbonate. The apparatus in the figure causes a mist of caustic soda (sodium hydroxide) to react with exhaust gas carbon dioxide to form carbonate salt that is sodium carbonate, and then produces calcium carbonate by reacting the sodium carbonate with calcium hydroxide. However, the carbonate salt manufactured by the present invention is not specifically limited to calcium carbonate and can be any carbonate salt formed by reacting exhaust gas carbon dioxide with positive ions in an aqueous alkaline solution. For example, sodium carbonate, etc. can be formed as carbonate salt.

The manufacturing apparatus 100 shown in FIG. 1 is also provided with pre-processing units 4 that remove $SO_x$ and $NO_x$ atmospheric pollutants and particulate matter (PM) from the exhaust gas. The pre-processing units 4 include a particulate matter removal pre-processing unit 3 and an $SO_x$ and $NO_x$ atmospheric pollutant pre-processing unit 2. This manufacturing apparatus 100 removes $SO_x$ and $NO_x$ atmospheric pollutants from the exhaust gas after removing particulate matter, and produces carbonate salt from the exhaust gas carbon dioxide.

The carbonate salt manufacturing apparatus 100 shown in FIG. 1 produces carbonate salt using exhaust gas carbon dioxide as raw material, where particulate matter and $SO_x$ and $NO_x$ atmospheric pollutants have been removed from that exhaust gas. This manufacturing apparatus 100 is provided with an atomizer 1 that converts aqueous alkaline solution to a mist; a mixer 6 that mixes mist generated by the atomizer 1 with exhaust gas to absorb exhaust gas carbon dioxide in the mist and forms carbonate salt by reaction of carbon dioxide with positive ions in the mist; and a separator 7 that separates the mist absorbed carbon dioxide in the form of carbonate salt from the exhaust gas. The manufacturing apparatus 100 shown in FIG. 1 uses caustic soda (sodium hydroxide) as the aqueous alkaline solution, forms sodium carbonate by reacting carbon dioxide with the sodium hydroxide, and is provided with a reacting chamber 80 to convert the sodium carbonate to calcium carbonate. The manufacturing apparatus 100 is also provided with a controller 5 to control the atomizer 1.

Atomizer 1

Figure 2:
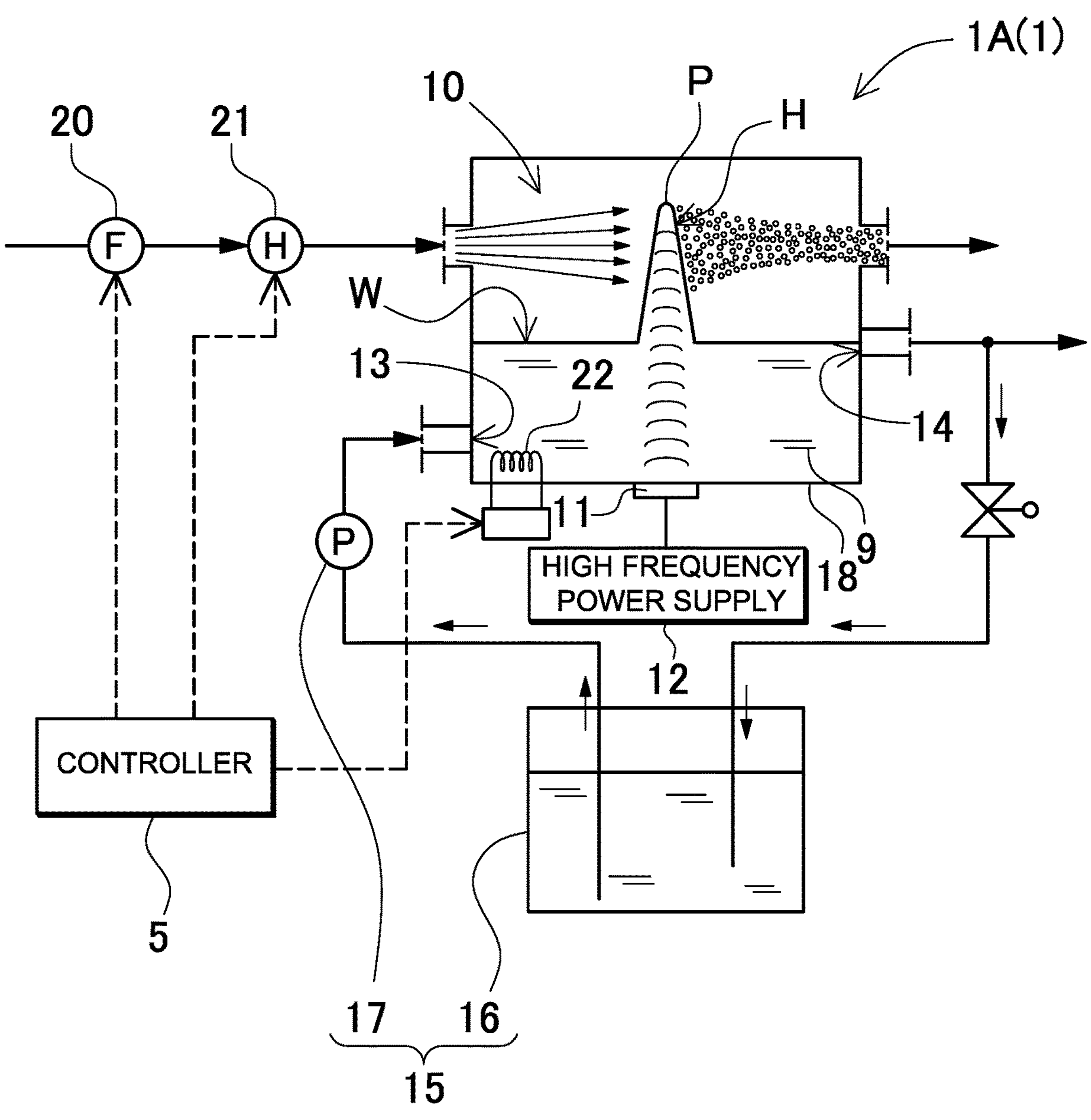
FIG. 2 is a schematic diagram showing an ultrasonic atomizer, which is one example of an atomizer.

The atomizer 1 converts the aqueous alkaline solution to a mist. Positive ions included in the mist react with exhaust gas carbon dioxide to form carbonate salt. The aqueous alkaline solution mist is formed as a fine mist with small particle diameter, and mist particle surface area can be made large with respect to unit particle weight. Fine mist particles with large surface area have a large area of contact with the exhaust gas, and carbon dioxide included in the exhaust gas is rapidly absorbed in the mist. FIG. 2 is a schematic drawing of the atomizer 1. The atomizer 1 in FIG. 2 ultrasonically vibrates the aqueous alkaline solution to generate a fine mist of aqueous alkaline solution. The atomizer 1 in FIG. 2 is an ultrasonic atomizer 1A that ultrasonically vibrates aqueous alkaline solution 9 to generate mist. Specifically, the ultrasonic atomizer 1A ultrasonically vibrates the aqueous alkaline solution 9 to form a liquid column P that protrudes from the surface W of the aqueous alkaline solution 9, and this disperses a fine mist from the liquid surface. The ultrasonic atomizer 1A blows a carrier gas over the surface of the aqueous alkaline solution 9 liquid column P to diffuse fine mist (nano-mist) into the carrier gas and form a mist-and-gas mixture. The atomizer 1 is provided with an atomizing chamber 10 that holds aqueous alkaline solution 9, an ultrasonic transducer 11 that ultrasonically vibrates the aqueous alkaline solution 9 to establish a liquid column P that protrudes from the liquid surface W, a high frequency power supply 12 connected to the ultrasonic transducer 11 that supplies high frequency power to the ultrasonic transducer 11 to make it vibrate ultrasonically, and a blower mechanism 20 that blows carrier gas into the atomizing chamber 10 to disperse mist from the surface of the liquid column P and form a mist-and-gas mixture.

The atomizing chamber 10 is an enclosure that holds aqueous alkaline solution 9 with the liquid surface W maintained at a constant level and internally generates mist. Mist generated in the atomizing chamber 10 is diffused into carrier gas blown into the chamber and a mist-and-gas mixture is discharged from the chamber. The atomizing chamber 10 is not necessarily completely closed and can have openings. The atomizing chamber 10 of the ultrasonic atomizer 1A shown in FIG. 2 is provided with an aqueous alkaline solution 9 supply inlet 13 located below the liquid surface. An overflow outlet 14 is opened to maintain the supplied aqueous alkaline solution 9 at a constant level. Aqueous alkaline solution 9 is supplied through the supply inlet 13 and discharged through the overflow outlet 14. While the aqueous alkaline solution 10 is maintained at a constant level by the overflow outlet 14 in this atomizing chamber 10, the amount of aqueous alkaline solution introduced through the supply inlet 13 can also be controlled to maintain a constant liquid surface level. An atomizing chamber 10 that maintains a constant liquid surface level can keep the depth of the aqueous alkaline solution 9 ultrasonically vibrated by the ultrasonic transducer 11 at a value that produces the most efficient atomization.

The aqueous alkaline solution 9 is supplied to the atomizing chamber 10 by a solution supply system 15. The solution supply system 15 shown in FIG. 2 is provided with a solution tank 16 that holds aqueous alkaline solution 9, which is supplied to the atomizing chamber 10, and a solution pump 17 that pumps solution tank 16 aqueous alkaline solution 9 into the atomizing chamber 10. The suction side of the solution pump 17 is connected to the solution tank 16, and the discharge side of the pump is connected to the atomizing chamber 10. This solution supply system 15 continuously supplies aqueous alkaline solution 9 from the solution tank 16 to the atomizing chamber 10 with the solution pump 17.

Figure 3:
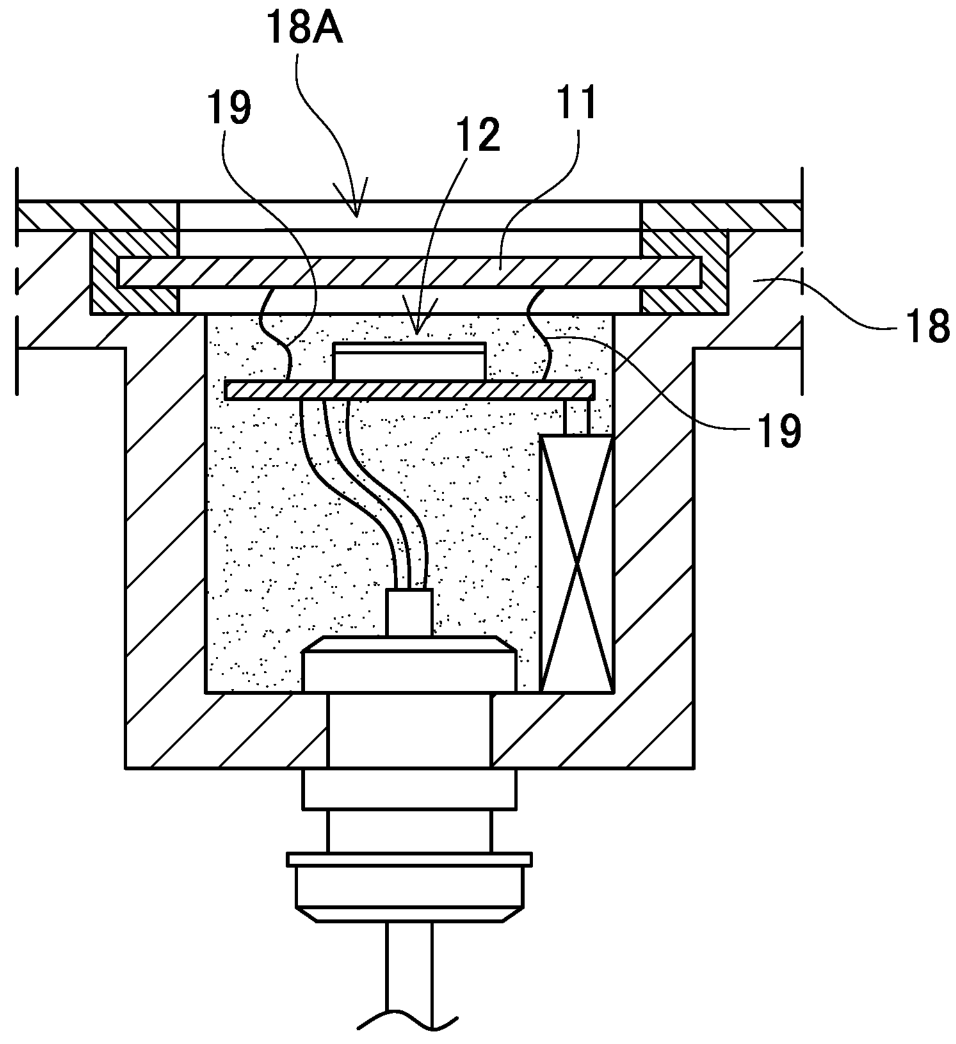
FIG. 3 is an enlarged cross-section showing ultrasonic transducer connecting structure.

The ultrasonic transducer 11 shown in the enlarged cross-section of FIG. 3 is fixed to the bottom plate 18 of the atomizing chamber 10 in a water-tight manner through an opening 18A in the bottom plate 18. The ultrasonic transducer 11 is electrically connected to a high frequency power supply 12 through electrodes established on the bottom surface of the transducer, and is ultrasonically vibrated by power from that high frequency power supply 12. The high frequency power supply 12 is connected to the ultrasonic transducer 11 via lead wires 19 and outputs high frequency power to the ultrasonic transducer 11.

As shown in FIG. 2, the blower mechanism 20 passes carrier gas over the surface of the liquid column P generated by ultrasonic vibration to blow mist from the surface and produce a mist-and-gas mixture. Numerous ultra-fine mist particles separate from the surface H of the ultrasonically vibrated liquid column P and disperse a highly concentrated mist. Carrier gas passed over the liquid column surface H blows-off and disperses mist from the surface H to form the mist-and-gas mixture. Rapidly blowing mist off the liquid column surface H reduces mist concentration at the surface H and has the effect of increasing atomizing efficiency. This is because mist cannot efficiently escape from the liquid column P surface when mist concentration at the surface H is high. Forced flow of carrier gas over the liquid column surface H extracts mist from the surface H, a portion of the fine mist is vaporized, and mist-and-gas mixture cooled by the heat of vaporization is discharged from the atomizer. Increasing the volume of carrier gas flow over the liquid column surface H can increase mist atomizing efficiency. However, in an atomizer 1 that blows carrier gas over the liquid column surface, the concentration of mist in the mist-and-gas mixture can decrease when carrier gas volume is further increased. Consequently, the volume of carrier gas flow (i.e. flow rate) is set to an optimum value considering both mist atomizing efficiency and mist concentration in the mist-and-gas mixture. The blower mechanism 20 is controlled by the controller 5 to adjust the volume of carrier gas supplied to the atomizing chamber 10.

The atomizer 1 of FIG. 2 has a horizontally disposed ultrasonic transducer 11, and the liquid column P protrudes vertically from the liquid surface W. However, the atomizer 1 can also have an ultrasonic transducer 11 disposed at an incline and the liquid column P can protrude at an incline with respect to the liquid surface W. Although the atomizer 1 in the figure is equipped with a single ultrasonic transducer 11, a plurality of ultrasonic transducers can also be provided to increase the amount of mist atomized in a given time. Further, the amount of mist generated can be controlled by adjusting ultrasonic transducer 11 output.

The atomizer 1 in FIG. 2 is provided with an air heater 21 that heats the carrier gas air and a solution heater 22 that heats the aqueous alkaline solution 9. The atomizer 1 heats the air (carrier gas) and aqueous alkaline solution 9 to increase atomizing efficiency and increase the amount of mist generated in a given time. The air heater 21 and solution heater 22 are controlled by the controller 5 to regulate carrier gas temperature and aqueous alkaline solution temperature.

The aqueous alkaline solution 9 atomized to form mist in the atomizer 1 is preferably an aqueous alkaline solution that has metal ions as positive ions, and caustic soda (sodium hydroxide) or potassium hydroxide aqueous solutions are used. Power plants or factories located close to an ocean preferably use caustic soda (sodium hydroxide) aqueous solution that can be derived from sea water to reduce operating cost. However, potassium hydroxide can also be used as aqueous alkaline solution. An apparatus that uses potassium hydroxide as aqueous alkaline solution can advantageously utilize nitrogen components included in exhaust gas to form potassium nitrate fertilizer with the potassium in potassium hydroxide. Potassium nitrate fertilizer can be effectively used in agriculture as fertilizer containing both nitrogen and potassium. While recovering carbon dioxide gas from exhaust gas, this manufacturing apparatus also effectively utilizes nitrogen components in the exhaust gas, and as a result is extremely economic. However, the present invention does not specify the aqueous alkaline solution as an aqueous solution of caustic soda (sodium hydroxide) or potassium hydroxide, and aqueous solutions that include other alkaline metals or alkaline earth metals, or natural material or waste material that contains alkaline metals or alkaline earth metals dissolved in water can also be used as the aqueous alkaline solution.

The atomizer 1 is controlled by the controller 5. In addition to controlling the atomizer 1, the controller 5 also regulates exhaust gas and mist-and-gas mixture flow rates. The controller adjusts the environment inside the mixer 6 to suppress mist vaporization based on signals input from temperature sensors 27 and 28. Further, the controller 5 regulates exhaust gas and mist-and-gas mixture flow rates, and controls proportions of exhaust gas $SO_x$ and $NO_x$ atmospheric pollutants and alkaline components in the aqueous alkaline solution.

Mixer 6

The mixer 6 mixes mist-and-gas mixture from the atomizer 1 with carbon dioxide gas included in the exhaust gas, induces absorption of carbon dioxide gas into the mist, and causes positive ions in the mist to react with the carbon dioxide gas producing mist that includes carbonate salt. Internal temperature of the mixer 6 is maintained at or below the dew point to suppress mist vaporization. This is because the efficiency of carbon dioxide gas dissolution into liquid mist to form carbonate salt decreases when mist vaporizes and liquid components decrease. The flow rate and temperature of mist-and-gas mixture and exhaust gas supplied to the mixer 6 are regulated by the controller 5, and this allows mixer 6 internal temperature to be maintained at or below the dew point.

Figure 4:
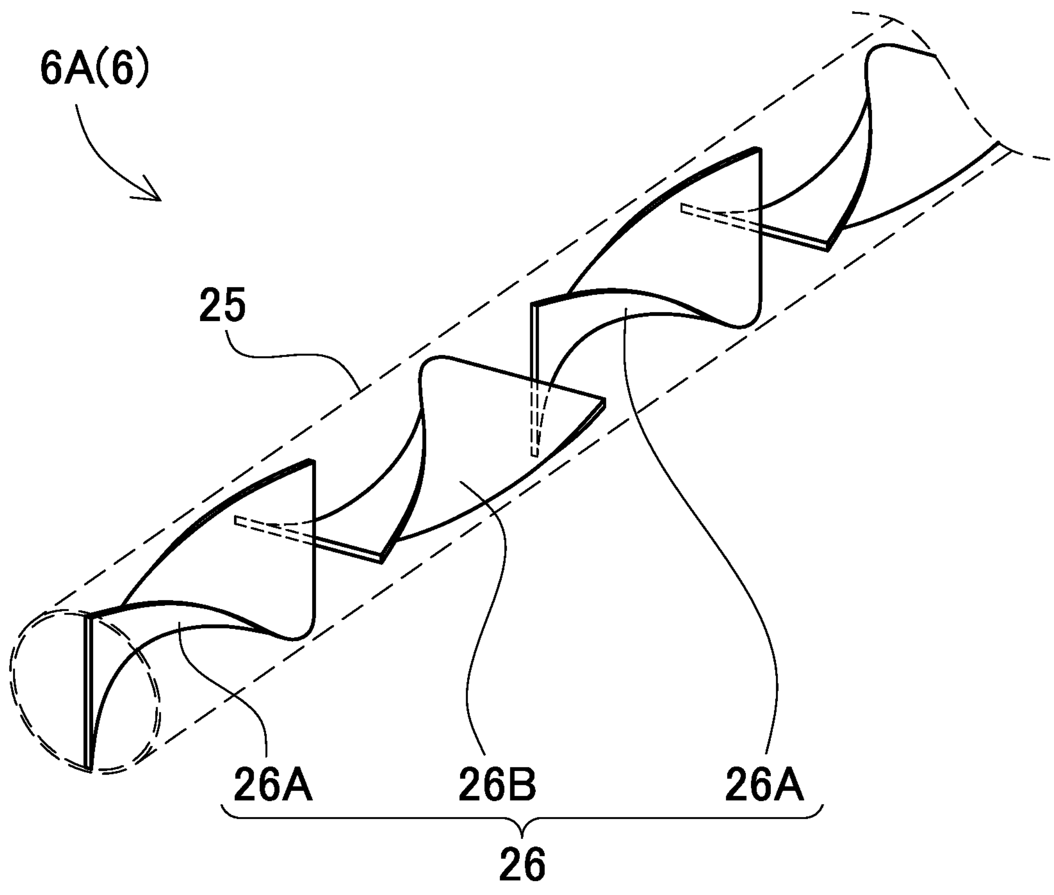
FIG. 4 is an abbreviated oblique diagram showing a static mixer, which is one example of a mixer.

A static mixer is preferably used as the mixer 6. FIG. 4 is an abbreviated oblique diagram illustrating a static mixer. The static mixer 6A has multiple stages of element blades 26 disposed inside duct material 25. The mixer 6A mixes exhaust gas and mist-and-gas mixture flowing through the duct material 25 by alternate left and right flow reversal through element blades 26 disposed in multiple stages. Each element blade 26 is rectangular plate material with a width equal to the internal diameter of the duct material 25 and a length 1.5 times the width. Right element blades 26A, which are twisted 180° to the right, and left element blades 26B, which are twisted 180° to the left, are disposed alternately in the flow direction inside the duct material 25. Adjacent right element blades 26A and left element blades 26B are disposed inside the duct material 25 with blade ends at right angles at each boundary between element blades. Flow through this static mixer 6A is split in half and rotation is reversed each time flow enters the downstream element blade 26 of an adjacent element blade 26 pair. By increasing the number of stages of alternately disposed right element blades 26A and left element blades 26B, this static mixer 6A can more uniformly mix the exhaust gas and mist-and-gas mixture.

In this static mixer 6A, flow splits in half each time it enters the next element blade 26. For example, a static mixer 6A with 20 stages of right element blades 26A and left element blades 26B divides flow through the mixer a total of $2^{20}$ (1048576) times. Consequently, exhaust gas and mist-and-gas mixture are efficiently mixed, exhaust gas and mist-and-gas mixture are efficiently put in close contact, carbon dioxide in the exhaust gas is absorbed into the mist, and mist positive ions efficiently react with carbon dioxide to form mist containing carbonate salt. Since the total length of each right element blade 26A and left element blade 26B is made short (i.e. 1.5 times the width), the number of element blade stages can be numerous while keeping overall mixer length short. Accordingly, a static mixer of limited length can efficiently mix the two fluids and cause carbon dioxide to react with mist positive ions to produce carbonate salt with high efficiency. Two fluids can also be efficiency mixed when element blades in the static mixer 6A are made long. The manufacturing apparatus 100 of FIG. 1 mixes mist-and-gas mixture supplied from the atomizer 1 with exhaust gas, causes carbon dioxide to be absorbed in the mist, and causes mist positive ions to react with the carbon dioxide to make carbonate salt.

Separator 7

Figure 5:
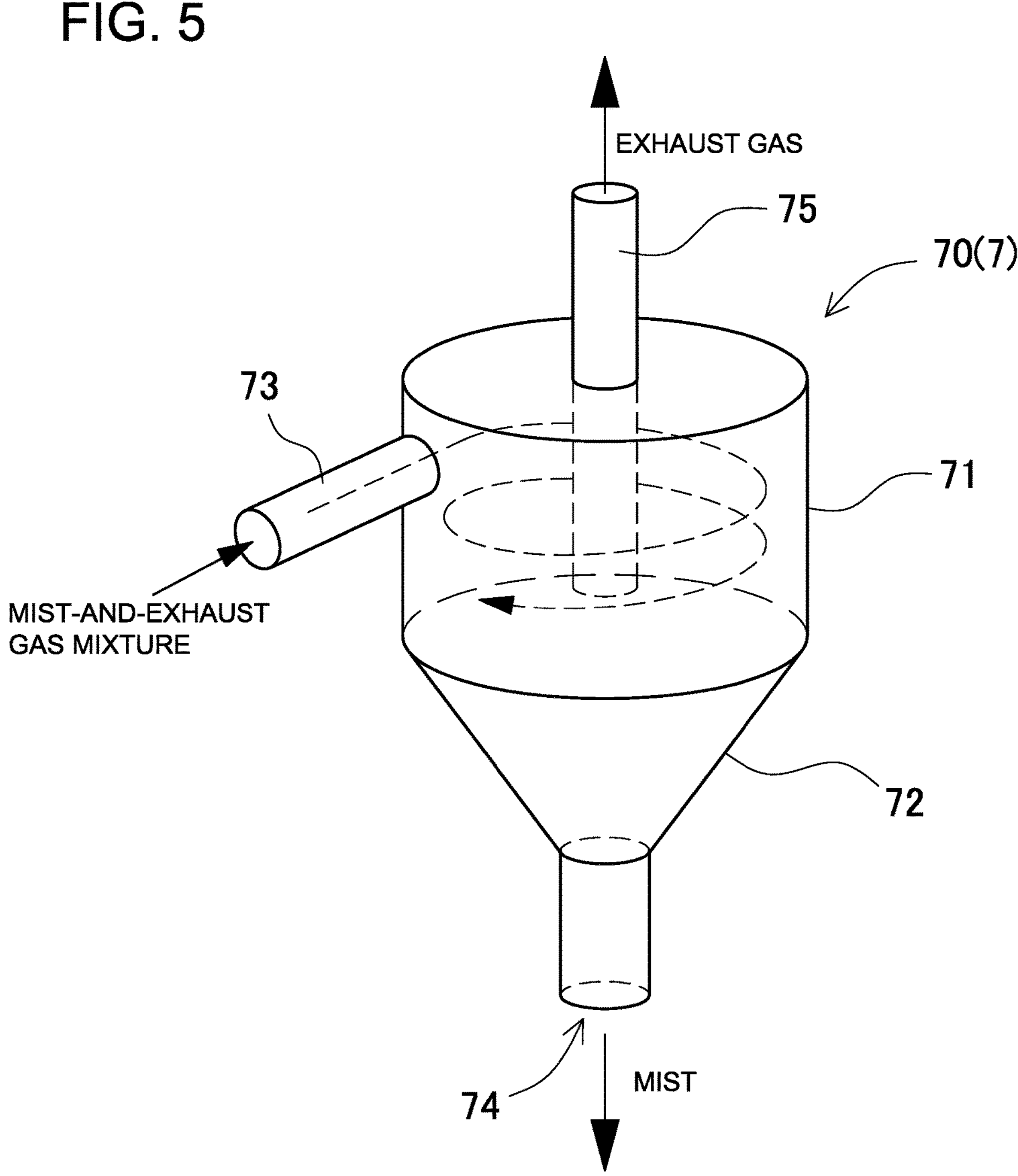
FIG. 5 is an abbreviated oblique diagram showing a cyclone separator, which is one example of a separator.

The separator 7 separates exhaust gas to retrieve mist that contains carbonate salt. Namely, the separator 7 recovers mist to obtain carbonate salt solution. Preferably, the separator 7 is a cyclone separator 70. The cyclone separator 70 shown in FIG. 5 has a cylindrical shape with cylinder region 71 and a tapered region 72 that narrows towards the bottom of the separator. The cyclone separator 70 circulates exhaust gas that contains mist internally in vortex fashion and separates mist from the exhaust gas by centrifugal force. Namely, the cyclone separator 70 separates mist due to the action of centrifugal force. The rotating mist redistributes to move to the outside due to centrifugal force. Centrifugal force that acts on the mist increases in proportion to the mass of the mist. Mass of the mist is large compared to mass of the exhaust gas, and mist particle mass increases in proportion to the cube of the mist particle radius. Mist particles generated by ultrasonic vibration with size on the order of micrometers have much greater mass than mist particles with size on the order of nanometers, and those larger particles can increase separation efficiency of the cyclone separator 70. Since the ultrasonic atomizer 1A efficiently generates micron-order mist particles, mist produced by the ultrasonic atomizer 1A can be efficiently separated from exhaust gas by the cyclone separator 70.

To rapidly circulate exhaust gas that includes mist (i.e. mist-and-gas mixture combined with exhaust gas), the cyclone separator 70 has an inlet duct 73 connected to the cylinder region 71 that introduces the exhaust gas including mist in a tangential direction (with respect to the cylinder region 71). Exhaust gas including mist that flows tangentially into the cylinder region 71 from the inlet duct 73 rapidly circulates inside the cylinder region 71. Mist in the exhaust gas rapidly rotated inside the cylinder region 71 moves towards the outside of the cylinder region 71 due to centrifugal force. Mist forced to the outside of the cylinder region 71 makes contact with the inside surface of the cylinder region wall and flows as a liquid down the cylinder region wall into the tapered region 72. To discharge liquid that flows into the tapered region 72, a liquid outlet 74 is established at the bottom of the tapered region 72. A liquid recovery tank 76 that recovers and holds carbonate salt solution is disposed beneath the liquid outlet 74. Exhaust gas from which mist has been separated is discharged outside the separator through an exhaust duct 75, which is disposed at the center of the cylinder region 71 and extends vertically in an axial direction. Exhaust gas, which has less specific gravity than the mist is less affected by centrifugal force and can be discharged to the outside from center of the cylinder region 71.

While the separator 7 described above separates mist from exhaust gas with a single cyclone separator 70, a multi-cyclone separator having a plurality of cyclone separators connected in series and parallel can be used to more efficiently separate mist. A multi-cyclone separator has inlet-side cyclone separator(s) connected with outlet-side cyclone separators. Outlet-side cyclone separators are a plurality of cyclone separators, which are smaller than inlet-side cyclone separator(s), connected in parallel. The exhaust duct of an inlet-side cyclone separator branches to connect with inlet ducts of the outlet-side cyclone separators. Exhaust gas including mist, from which (some) mist has been separated by the inlet-side separator, branches into inlet ducts of the outlet-side cyclone separators. The outlet-side cyclone separators further separate mist from the exhaust gas and mist input from the inlet-side separators. A multi-cyclone separator separates mist from exhaust gas that includes mist with both the inlet-side separator(s) and outlet-side separators and this efficiently separates mist.

An apparatus using a cyclone separator 70 as the separator 7 has the characteristic that mist can be efficiently separated with a simple configuration. However, the present invention is not specified to have a separator 7 that is a cyclone separator 70, and any separator that can separate mist from exhaust gas (that includes mist) can be used. For example, a static electricity separator or de-mister can also be used. A static electricity separator has discharge electrode(s) that charge mist particles in the flow path of the exhaust gas that includes mist, and collector electrode(s) to which the electro-statically charged mist particles adhere for separation. Since a static electricity separator adheres and collects mist particles electro-statically, smaller mist particles can be separated efficiently.

Reacting Chamber 80

The liquid recovery tank 76 disposed beneath the cyclone separator 70 recovers and retains carbonate salt solution. An apparatus that uses caustic soda (sodium hydroxide) as the aqueous alkaline solution to form mist produces sodium carbonate from the reaction of sodium hydroxide mist with exhaust gas carbon dioxide. Accordingly, the carbonate salt solution retained in the recovery tank 76 of this apparatus is sodium carbonate solution. The manufacturing apparatus 100 in FIG. 1 is provided with a reacting chamber 80 to form calcium carbonate, which has higher commercial value than sodium carbonate.

Figure 6:
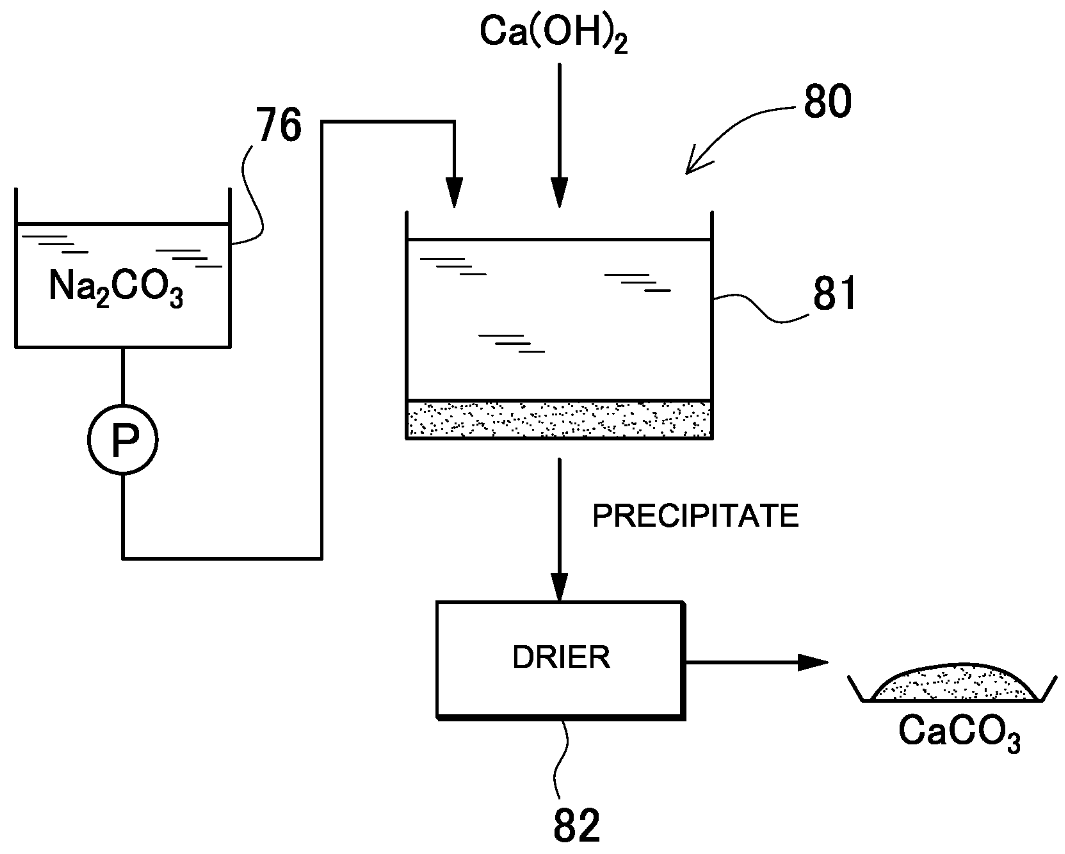
FIG. 6 is a process flow diagram showing one example of the reaction process.

As shown in FIG. 6, calcium hydroxide is mixed with sodium carbonate solution to react sodium carbonate and calcium hydroxide in the reacting chamber 80 and form calcium carbonate. In the reacting chamber 80 of FIG. 6, calcium hydroxide is added to sodium carbonate in the mixing receptacle 81 and that mixture produces calcium carbonate. The added calcium hydroxide dissociates and reacts with sodium carbonate to form calcium carbonate according to chemical equation (1) below. The calcium carbonate produced has little solubility and precipitates to the bottom of the mixing receptacle 81. Sodium hydroxide (caustic soda) is highly soluble and is in solution as a liquid. The reacting chamber 80 mixes sodium carbonate solution and calcium hydroxide in essentially the same molar concentrations to form calcium carbonate. The calcium carbonate precipitate at the bottom of the mixing receptacle 81 is recovered from the mixing receptacle 81 and moisture is removed by techniques such as filtering. Finally, the calcium carbonate precipitate is dried by a drier 82 to recover calcium carbonate in powder form.

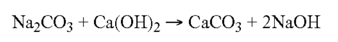

$$Na_2CO_3 + Ca(OH)_2 \rightarrow CaCO_3 + 2NaOH \quad (1)$$

Controller 5

The controller 5 controls the flow rate and temperature of carrier gas and exhaust gas supplied to the atomizer 1 considering mist concentration and atomizing efficiency of the atomizer 1. The controller 5 controls the air heater 21 to heat air (carrier gas) and the solution heater 22 to heat aqueous alkaline solution 9 in the atomizer 1. By heating the air and aqueous alkaline solution, atomizing efficiency of the atomizer 1 can be improved and the amount of mist generated per unit time can be increased. The air heater 21 and the solution heater 22 are controlled by the controller 5 to regulate air temperature and aqueous alkaline solution temperature.

In addition to the atomizer 1, the controller 5 also controls the flow rates of exhaust gas and mist-and-gas mixture supplied to the mixer 6. For example, signals from temperature sensors 27 and 28 disposed in the mixer 6 are input to the controller 5 to control the environment inside the mixer 6 and suppress mist vaporization. Further, the controller 5 controls flow rates of the exhaust gas and mist-and-gas mixture to adjust the ratio of exhaust gas carbon dioxide to alkali components in the aqueous alkaline solution. For example, when aqueous alkaline solution sodium hydroxide mist is reacted with exhaust gas carbon dioxide to form sodium carbonate, the controller 5 controls the supply fan 29, which adjusts the amount of mist-and-gas mixture supplied to the mixer 6, to enable carbon dioxide and sodium hydroxide to combine in the specific ratio that efficiently produces sodium carbonate. The controller 5 can detect the pH of mist recovered by the separator 7 and control the quantity of mist-and-gas mixture supplied to the mixer 6. Here, the controller 5 controls the flow rate of mist-and-gas mixture supplied from the atomizer 1 to the mixer 6.

The controller 5 adjusts temperature and flow rate of the mist-and-gas mixture and exhaust gas supplied to the mixer to suppress mist vaporization inside the mixer 6. In addition, the controller 5 regulates the flow rate and temperature of carrier gas air supplied to the atomizer 1, regulates the temperature of the ultrasonically vibrated aqueous alkaline solution, and can control the temperature and humidity of mist-and-gas mixture supplied to the mixer 6. When temperature of the mist-and-gas mixture supplied to the mixer 6 is high and air flow rate is high, relative humidity inside the mixer can drop and mist can easily vaporize. Accordingly, the controller 5 detects temperature and humidity inside the mixer 6 and controls the air heater 21, the solution heater 22, as well as the blower mechanism 20, which sets air flow rate into the atomizer 1, to keep the relative humidity inside the mixer 6 within a set range. Further, the controller 5 adjusts exhaust gas flow rate and the amount of outside air flow into the exhaust gas to maintain relative humidity inside the mixer 6 within a set range. Preferably, mixer interior is in a supersaturated state with relative humidity greater than or equal to 100%. Namely, mixer 6 internal temperature is at or below the dew point to effectively suppress mist vaporization.

Atomizing efficiency of the atomizer 1 can be increased by increasing the flow rate and temperature of air blown at the liquid column P, and by heating the aqueous alkaline solution 9 to increase its temperature. Accordingly, the controller 5 adjusts the flow rate and temperature of air blown at the liquid column P considering the atomizing efficiency the atomizer 1. While atomizing efficiency is increased by increasing air flow rate and temperature, the percentage of mist vaporized inside the mixer 6 increases. Therefore, (considering this trade-off) the controller 5 detects temperature and humidity inside the mixer 6 and adjusts the flow rate and temperature of air that the atomizer 1 inputs to the liquid column P. Ideally, the controller 5 keeps atomizing efficiency high with high air flow rate and temperature while maintaining moisture conditions inside the mixer 6 that attain a supersaturated or nearly supersaturated state to suppress mist vaporization. In an atomizer 1 provided with a solution heater 22, aqueous alkaline solution temperature is increased within a range that allows supersaturated or nearly supersaturated conditions to be maintained inside the mixer 6.

The flow rate and temperature of exhaust gas supplied to the mixer 6 affects mist vaporization inside the mixer 6. Mist vaporization inside the mixer 6 can be suppressed by cooling high temperature exhaust gas containing water vapor to the dew point or below prior to introduction to the mixer 6. If high temperature low humidity exhaust gas is supplied to the mixer 6, relative humidity inside the mixer will drop promoting mist vaporization. In particular, since relative humidity inside the mixer 6 decreases and promotes mist vaporization when low humidity exhaust gas is introduced to the mixer 6 in large quantities, high temperature exhaust gas can be cooled to increase its relative humidity, or the relative humidity of mist-and-gas mixture supplied from the atomizer 1 to the mixer 6 can be controlled and relative humidity inside the mixer 6 can be maintained above the set range. To keep temperature inside the mixer at or below the dew point and suppress vaporization, the controller 5 detects mixer temperature and humidity and controls the temperature, humidity, and flow rate of exhaust gas and mist-and-gas mixture supplied to the mixer 6.

Pre-Processing Units 4

The pre-processing units 4 separate particulate matter (PM) and atmospheric pollutants and from exhaust gas discharged from facilities or equipment such as a power plant, blast furnace, or diesel engine. The pre-processing units 4 are provided with a particulate matter (PM) pre-processing unit 3 that separates particulate matter, and an atmospheric pollutant pre-processing unit 2 that separates atmospheric pollutants. The manufacturing apparatus 100 in FIG. 1 separates particulate matter from exhaust gas in the PM pre-processing unit 3, subsequently separates $SO_x$ and $NO_x$ in the atmospheric pollutant pre-processing unit 2, and produces carbonate salt from carbon dioxide in the exhaust gas.

PM Pre-Processing Unit 3

Figure 7:
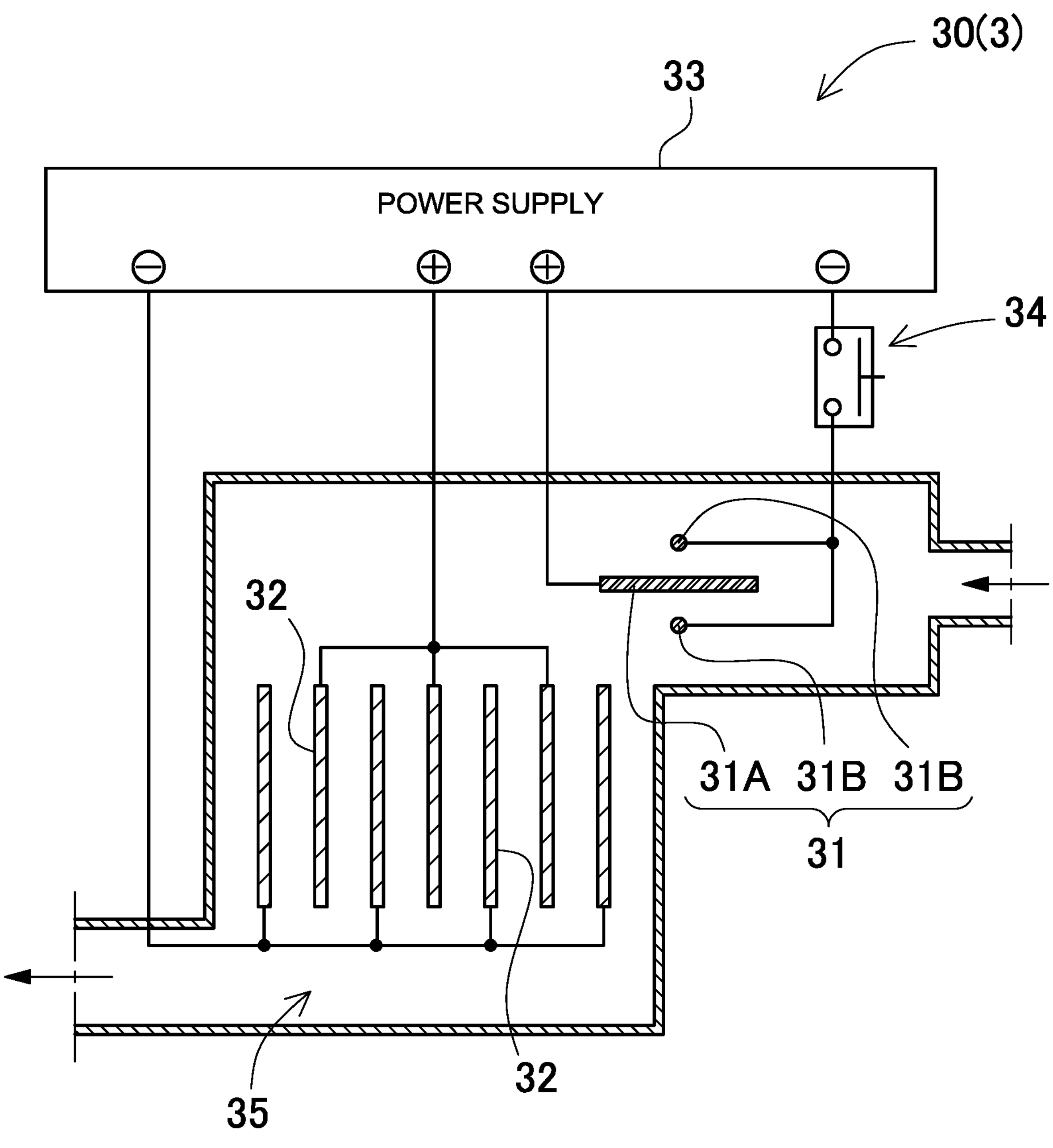
FIG. 7 is a schematic diagram showing one example of a particulate matter (PM) pre-processing unit.

The PM pre-processing unit 3 can employ an electrostatic dust collector to effectively remove extremely small particles. As shown in FIG. 7, the electrostatic dust collector 30 is provided with discharge electrodes 31, collector electrodes 32, and a power supply 33 to separate fine particulates from exhaust gas via the action of static electricity.

The discharge electrodes 31 have a positive electrode 31A and negative electrodes 31B disposed in opposition within the air (gas) circulation path 35. The negative electrodes 31B are two thin metal wires disposed in a parallel configuration via insulating material (not illustrated). A positive electrode 31A in the form of a plate is disposed between the two negative electrodes 31B. The positive electrode 31A is fixed in an orientation parallel to the air flow direction to allow air to flow smoothly around the positive electrode plate. The positive electrode 31A is directly connected, and the negative electrodes 31B are connected through a switch 34 to the power supply 33. The power supply 33 applies a voltage that can induce corona discharge (e.g. 3000V to 10000V) between the positive electrode 31A and negative electrodes 31B. When the switch 34 is turned on, high negative potential is applied to the negative electrodes 31B. The positive electrode 31A is connected to the power supply ground. In normal operation, metal wire negative electrodes 31B are connected to the negative side of the power supply 33, and the positive electrode 31A plate is connected to positive side of the power supply 33 to induce negative corona discharge. This is because negative corona discharge causes higher current flow than positive corona discharge and enables particulate matter in the air to be effectively electro-statically charged. However, the metal wire electrodes could also be connected to the positive side of the power supply to act as positive electrodes, and the plate electrode could be connected to the negative side of the power supply to act as a negative electrode The collector electrodes 32 are disposed within the air (gas) circulation path 35 closer to the air outlet than the discharge electrodes 31. The collector electrodes 32 cause particulate matter charged by the discharge electrodes 31 to adhere to the collector electrodes 32 via electro-static attraction. Accordingly, the collector electrodes 32 are plate electrodes disposed in parallel orientation via insulating material. The collector electrode plates are connected to the power supply 33 and a potential (e.g. 2000V to 15000V) capable of attracting and adhering particulate matter is imposed on the electrodes by the power supply 33.

The electrostatic dust collector 30 described above electro-statically charges particulate matter included in exhaust gas with the discharge electrodes 31, and recovers the charged particulate matter on the surface of the collector electrodes 32 by electro-static adhesion. The electrostatic dust collector 30 can efficiently collect extremely small particles included in the exhaust gas. However, PM pre-processing unit 3 does not necessarily employ an electrostatic dust collector, and any equipment that can separate particulate matter from exhaust gas (e.g. a bag filter or cyclone separator) can also be used.

Atmospheric Pollutant Pre-Processing Unit 2

The atmospheric pollutant pre-processing unit 2 can employ any pre-processing unit presently in use or any pre-processing unit developed from this point in time. Accordingly, the present invention does not specify a particular atmospheric pollutant pre-processing unit 2, but rather describes the following atmospheric pollutant pre-processing unit as a preferable example.

Figure 8:
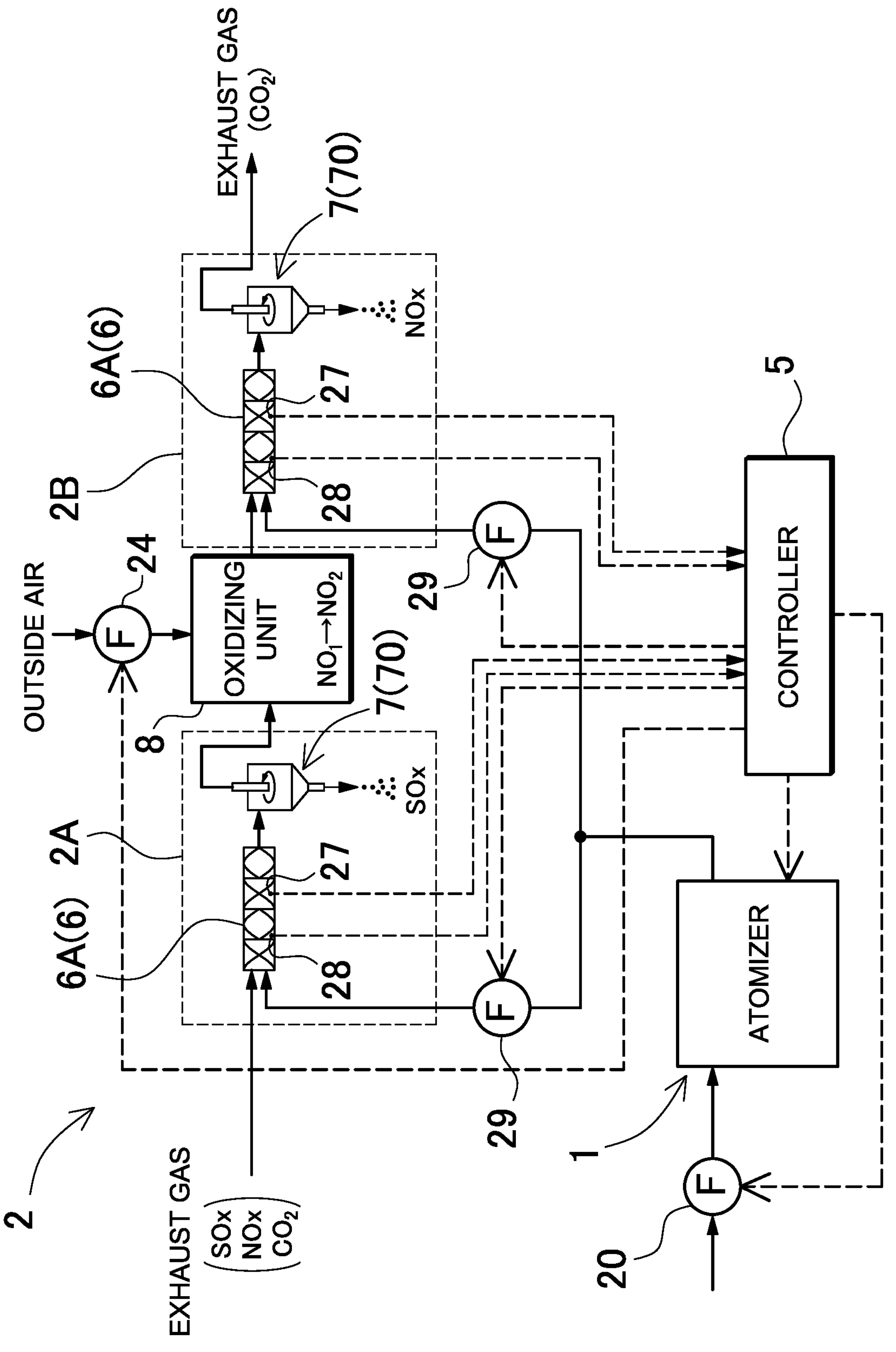
FIG. 8 is a schematic diagram showing one example of an atmospheric pollutant pre-processing unit

The atmospheric pollutant pre-processing unit 2 in FIG. 8 mixes mist and exhaust gas, in the same manner as the carbonate salt manufacturing apparatus 100, to absorb $SO_x$ and $NO_x$ into the mist and separate those components from the exhaust gas. This atmospheric pollutant pre-processing unit 2 is provided with an atomizer 1 that atomizes aqueous alkaline solution, a mixer 6 that mixes mist generated by the atomizer 1 with exhaust gas to absorb exhaust gas $SO_x$ and $NO_x$ into the mist, and a separator 7 to recover mist that has absorbed $SO_x$ and $NO_x$. The atomizer 1, mixer 6, and separator 7 can have the same structure as in the carbonate salt manufacturing apparatus 100. For example, the atomizer 1 atomizes caustic soda (sodium hydroxide) to form mist. Sodium hydroxide mist mixes with exhaust gas in the mixer 6, and $SO_x$ and $NO_x$ are absorbed in the mist and react with sodium metal ions. Mist that has absorbed $SO_x$ and $NO_x$ is collected by the cyclone separator 70 to remove $SO_x$ and $NO_x$ from the exhaust gas.

The atmospheric pollutant pre-processing unit 2 mixes sodium hydroxide solution with the exhaust gas to separate $SO_x$ and $NO_x$. Since $SO_x$ and $NO_x$ are more reactive than carbon dioxide, exhaust gas and sodium hydroxide mist can be mixed and $SO_x$ and $NO_x$ can be separated from the exhaust gas while leaving carbon dioxide in the exhaust gas.

The atmospheric pollutant pre-processing unit 2 shown in FIG. 8 is configured with a first processing unit 2A and a second processing unit 2B. The output side of the first processing unit 2A is connected to the second processing unit 2B of this atmospheric pollutant pre-processing unit 2. The first processing unit 2A primarily separates $SO_x$ from the exhaust gas, and the second processing unit 2B primarily separates $NO_x$. $SO_x$ is more reactive with sodium hydroxide than $NO_x$ and is efficiently absorbed by contact with the sodium hydroxide mist. The second processing unit 2B separates $NO_x$ from exhaust gas that has been treated by the first processing unit 2A to remove $SO_x$.

The atmospheric pollutant pre-processing unit 2 in FIG. 8 has an oxidizing unit 8 connected between the first processing unit 2A and the second processing unit 2B. The oxidizing unit 8 oxidizes exhaust gas $NO_1$ to form $NO_2$. Exhaust gas contains $NO_x$ in the form of $NO_1$ and $NO_2$, but $NO_1$ is not very soluble in water (i.e. aqueous solution). To oxidize exhaust gas $NO_1$ and form more soluble $NO_2$, the atmospheric pollutant pre-processing unit 2 in FIG. 8 is provided with an oxidizing unit 8 that mixes exhaust gas with outside air that is an oxygen containing gas. The oxidizing unit 8 mixes outside air as oxygen containing gas with the exhaust gas to oxidize $NO_1$ and form $NO_2$. Exhaust gas $NO_1$ is easily oxidized and combines with oxygen in air to make $NO_2$. Outside air mixed with exhaust gas not only oxidizes $NO_1$, but also reduces the temperature of exhaust discharged in a high temperature state from sources such as a blast furnace or power plant and can cool the exhaust gas to the dew point or below. Supersaturated water vapor in exhaust gas cooled to the dew point or below condenses in the form of fine water droplets. Consequently, in exhaust gas mixed with outside air, $NO_1$ is converted to $NO_2$ and exhaust gas cooled to or below the dew point is in a supersaturated state. Exhaust gas cooled by outside air can be cooled to lower temperatures by increasing the amount of outside air mixed with the exhaust gas. The amount of outside air mixed with the exhaust gas is preferably adjusted to lower the temperature to or below the dew point (e.g. less than or equal to 150° C.).

The atmospheric pollutant pre-processing unit 2 in FIG. 8 has an oxidizing unit 8 connected to the inlet side of the second processing unit 2B that primarily separates $NO_x$ atmospheric pollutants. The oxidizing unit 8 supplies $SO_x$ removed exhaust gas that contains $NO_1$ and $NO_2$ to the second processing unit 2B. While this atmospheric pollutant pre-processing unit 2 has the oxidizing unit 8 connected between the first processing unit 2A and the second processing unit 2B, the oxidizing unit 8 can be connected to the inlet side of the first processing unit 2A to oxidize $NO_1$ and form $NO_2$. Accordingly, the oxidizing unit can also be connected to the inlet side of the first processing unit 2A or to the inlet side of the PM pre-processing unit 3.

Figure 9:
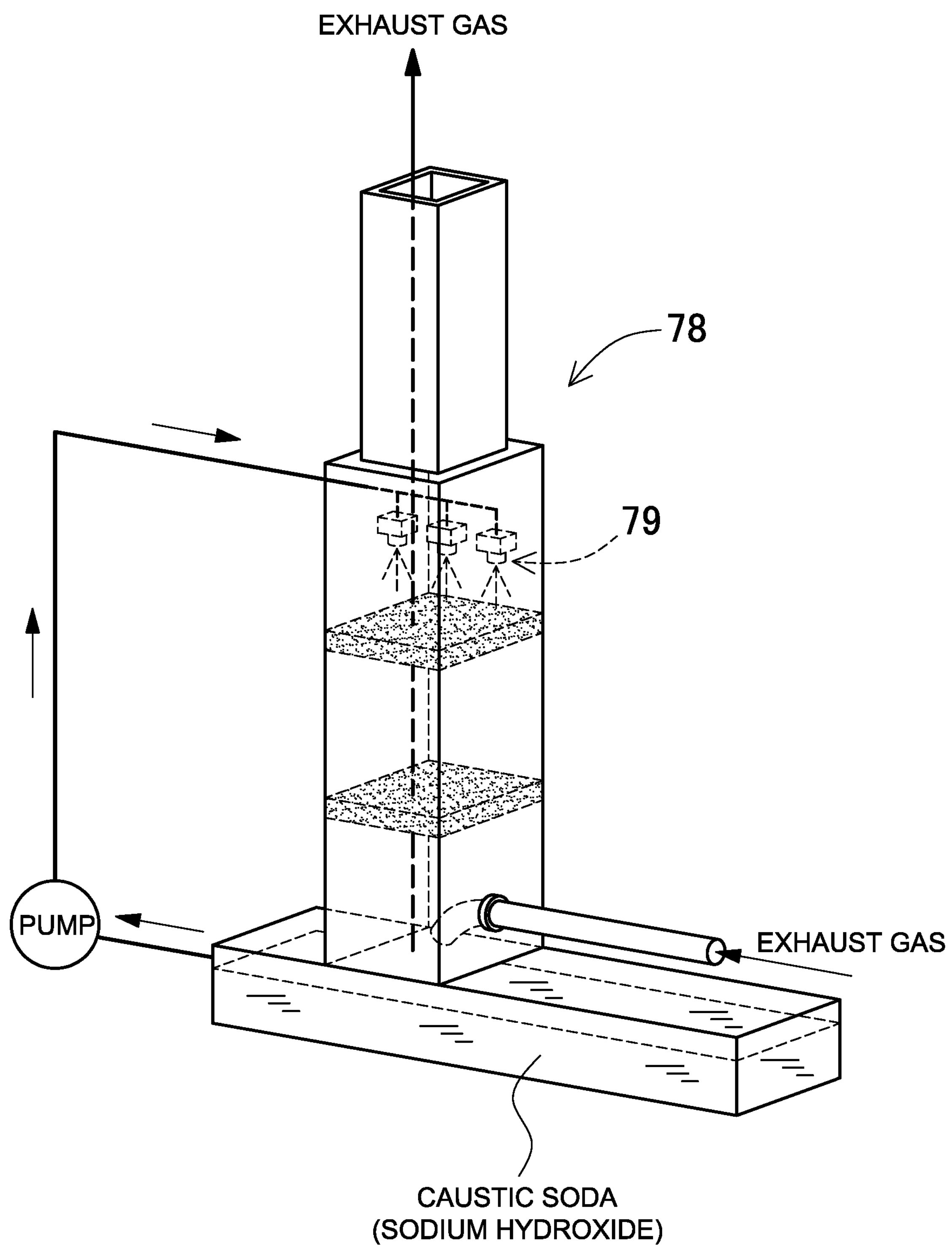
FIG. 9 is an abbreviated diagram showing a wet scrubber, which is another example of an atmospheric pollutant pre-processing unit

The atmospheric pollutant pre-processing unit 2 described above uses caustic soda (sodium hydroxide) as mist and mixes mist and exhaust gas to separate $SO_x$ and $NO_x$. Since this atmospheric pollutant pre-processing unit 2 mixes very fine mist with exhaust gas, contact area between the sodium hydroxide and exhaust gas is large and $SO_x$ and $NO_x$ atmospheric pollutants can be efficiently removed. However, the atmospheric pollutant pre-processing unit 2 can also separate $SO_x$ and $NO_x$ from exhaust gas with equipment such as the traditionally employed wet scrubber. The wet scrubber 78 shown in FIG. 9 sprays an aqueous solution, which absorbs and reacts with $SO_x$ and $NO_x$ such as sodium hydroxide, from nozzles 79 into the exhaust gas flow path, the sprayed sodium hydroxide makes contact with the exhaust gas, and $SO_x$ and $NO_x$ are absorbed in the sodium hydroxide for separation.

The carbonate salt manufacturing apparatus 100 in FIG. 1 produces carbonate salt using exhaust gas carbon dioxide as raw material by the following processing steps. Since the manufacturing apparatus 100 in this figure has pre-processing units 4 established at the flow inlet side, carbonate salt is produced from exhaust gas carbon dioxide after particulate matter and $SO_x$ and $NO_x$ atmospheric pollutants have been removed from the exhaust gas.

Pre-Processing Step

The pre-processing step separates particulate matter and $SO_x$ and $NO_x$ atmospheric pollutants from exhaust gas supplied to the mixer 6. The manufacturing apparatus 100 shown in FIG. 1 has a PM pre-processing unit 3 and an atmospheric pollutant pre-processing unit 2 disposed at the inlet side of the mixer 6. After particulate matter is separated and removed from exhaust gas by the PM pre-processing unit 3, $SO_x$ and $NO_x$ atmospheric pollutants are separated and removed from the exhaust gas by the atmospheric pollutant pre-processing unit 2.

Atomizing Step

The atomizing step forms mist from an aqueous alkaline solution with the atomizer 1. The atomizer 1 makes mist from aqueous alkaline solution and mixes that mist with a carrier gas to form a mist-and-gas mixture. The atomizer 1 makes mist from caustic soda (sodium hydroxide) used as the aqueous alkaline solution. The aqueous alkaline solution used by the atomizer 1 to form mist is not specifically limited to caustic soda (sodium hydroxide). For example, aqueous alkaline solutions of other alkaline metals such as potassium hydroxide, aqueous solutions that contain alkaline earth metals, and natural material or waste material that contain alkaline metals or alkaline earth metals dissolved in water can also be used. As shown in FIG. 2, the atomizer 1 generates mist by blowing carrier gas at the surface of a column of liquid P that protrudes from the solution surface due to ultrasonic vibration induced by an ultrasonic transducer 11. The carrier gas blows mist off the surface of the liquid column P to generate a mist-and-gas mixture. Mist absorption of carbon dioxide can be controlled by adjusting sodium hydroxide concentration in the mist. For example, aqueous alkaline solution concentration in the mist is greater than or equal to 1% by volume. By increasing aqueous alkaline solution concentration in the mist, carbon dioxide and atmospheric pollutants can be readily absorbed. Accordingly, aqueous alkaline solution concentration in the mist is preferably made as high as possible without supersaturating the mist with sodium hydroxide or potassium hydroxide etc.

Mixing Step

The mixing step mixes exhaust gas with mist-and-gas mixture in the mixer 6, induces exhaust gas carbon dioxide absorption in the mist, and causes positive ions in the mist to combine with carbon dioxide to form carbonate salt. For example, the mixing step mixes exhaust gas and mist-and-gas mixture using a static mixer 6A as the mixer 6 to absorb exhaust gas carbon dioxide in the mist. The static mixer 6A mixes mist-and-gas mixture supplied from the atomizer 1 with exhaust gas to absorb exhaust gas carbon dioxide in aqueous alkaline solution mist. Exhaust gas carbon dioxide combines with mist positive ions to form carbonate salt and generate mist that contains carbonate salt.

Separating Step

The separating step separates mist that contains carbonate salt produced in the mixing step from exhaust gas using a separator 7 that is connected to the outlet side of the mixer 6. For example, the separating step separates mist that contains carbonate salt from exhaust gas using a cyclone separator 70 as the separator 7. Since the manufacturing apparatus 100 in FIG. 1 uses caustic soda (sodium hydroxide) as alkaline component in the mist, sodium carbonate is generated as the carbonate salt from reaction of mist sodium hydroxide with exhaust gas carbon dioxide.

While processing steps described above cause exhaust gas carbon dioxide absorption in the mist and separation of carbonate salt from exhaust gas using the manufacturing apparatus 100 in FIG. 1, the controller 5 controls the atomizer 1 and mixer 6 to efficiently absorb exhaust gas carbon dioxide in the mist and efficiently separate that mist from the exhaust gas. The controller 5 detects temperature and humidity inside the mixer 6 to preferably maintain temperature inside the mixer at or below the dew point. In addition, the controller 5 adjusts parameters such as carrier gas (air) temperature and flow rate as well as the temperature to which aqueous alkaline solution is heated to enable efficient atomization of aqueous alkaline solution to form mist. Further, the controller 5 regulates temperatures and flow rates (i.e. flow rate ratio) of exhaust gas and carrier gas to effectively put exhaust gas carbon dioxide in contact with mist inside the mixer 6 and efficiently absorb carbon dioxide in the mist.

Reacting Step

The reacting step reacts sodium carbonate solution obtained in the separating step with calcium hydroxide to form calcium carbonate in the reacting chamber 80. By mixing and reacting calcium hydroxide with sodium carbonate obtained in the separating step, the manufacturing apparatus 100 in FIG. 1 produces calcium carbonate, which has higher commercial value. In this reacting step, sodium carbonate solution is mixed with calcium hydroxide in the mixing receptacle 81 to cause the sodium carbonate and calcium hydroxide to react and form calcium carbonate. Calcium carbonate precipitate generated in the reacting step is recovered and dried by a drier in the drying step to obtain calcium carbonate in powder form.

Second Embodiment

Figure 10:
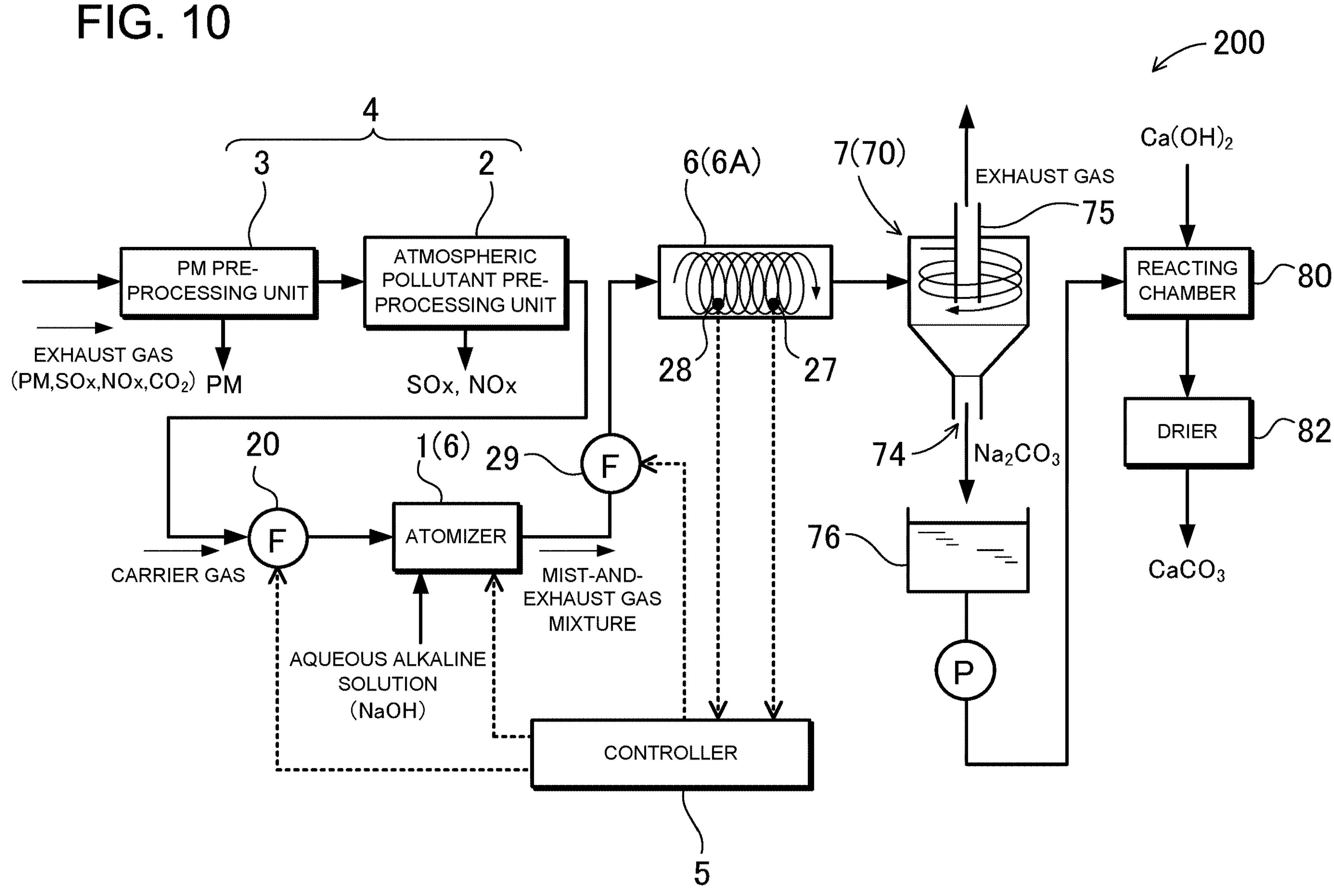
FIG. 10 is a schematic diagram of the carbonate salt manufacturing apparatus for the second embodiment of the present invention.

The carbonate salt manufacturing apparatus 200 in FIG. 10 supplies exhaust gas to the atomizer 1. This atomizer is equipped with a blower mechanism 20 that passes exhaust gas over the surface of a liquid column P generated by ultrasonic vibration and blows mist off the surface of the liquid column P to form a mist-and-exhaust gas mixture. If the exhaust gas supplied to the atomizer 1 is high temperature exhaust gas, mist is vaporized and atomizing efficiency is reduced. Accordingly, exhaust gas supplied to the atomizer 1 is temperature controlled. High temperature exhaust gas is cooled prior to introduction to the atomizer 1 to reduce temperature inside the atomizer 1 to the dew point or below. Since water vapor included in the exhaust gas can be condensed and removed by forced cooling, the exhaust gas can be supplied to the atomizer 1 with its absolute humidity reduced. Exhaust gas that is temperature controlled to put it in a low humidity state does not vaporize mist inside the atomizer 6 and atomizing efficiency reduction due to mist vaporization can be suppressed. However, if the temperature of exhaust gas supplied to the atomizer 1 is too low, atomizing efficiency can be reduced. Therefore, the temperature of exhaust gas, which is cooled prior to introduction to the atomizer 1, is controlled to a value that does not reduce atomizing efficiency.

Since the atomizer 1 of the manufacturing apparatus 200 in FIG. 10 mixes exhaust gas and mist to form mist-and-exhaust gas mixture, the atomizer 1 can serve the dual purpose as mist and exhaust gas mixer 6. A manufacturing apparatus with an atomizer 1 that also serves as a mixer 6 does not necessarily need a dedicated mixer connected in line with the atomizer 1, and exhaust gas can be mixed with mist to react exhaust gas carbon dioxide with mist positive ions and produce carbonate salt without a dedicated mixer. However, as shown in FIG. 10, ideally a mixer 6 is connected to the outlet side of the atomizer 1, mist-and-exhaust gas mixture mixed in the atomizer 1 is further mixed in the mixer 6, and this even more effectively mixes exhaust gas and mist to produce carbonate salt. A manufacturing apparatus 200 that supplies exhaust gas to the atomizer 1 does not supply carrier gas to the mixer 6 as in the manufacturing apparatus 100 in FIG. 1. Consequently, mist concentration inside the mixer 6 is increased to efficiently produce carbonate salt from carbon dioxide.

Third and Fourth Embodiments

Figure 11:
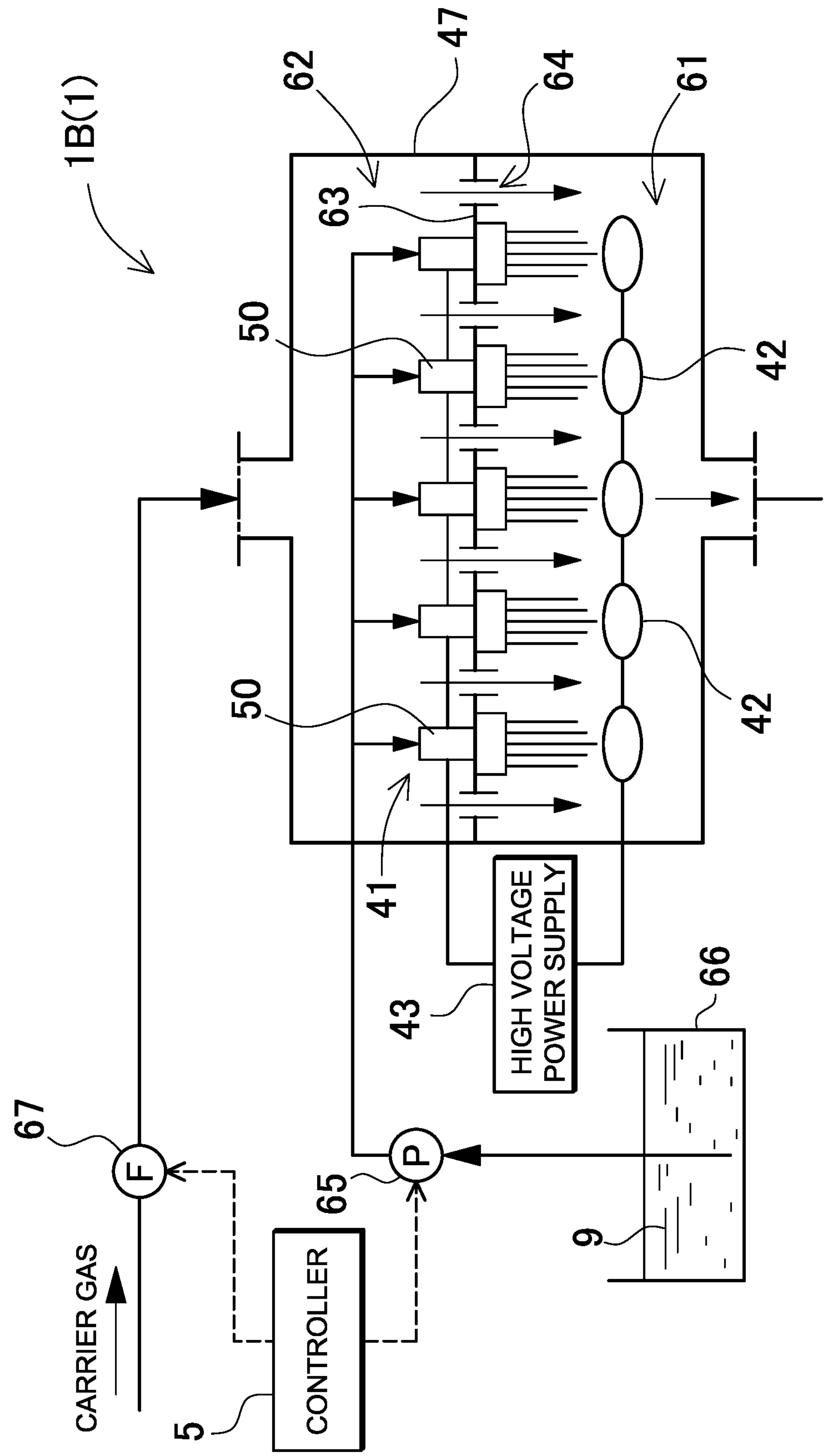
FIG. 11 is a schematic diagram showing a static electricity atomizer, which is another example of an atomizer.

While the manufacturing apparatus 100, 200 described above generate fine mist by ultrasonic vibration of aqueous alkaline solution, manufacturing apparatus for the third and fourth embodiments generate aqueous alkaline solution mist with a static electricity atomizer (in place of the ultrasonic atomizer used in manufacturing apparatus for the first and second embodiments). As shown in FIG. 11, the static electricity atomizer is provided with a spray assembly 41 that has a plurality of nozzles disposed in the upper part of an enclosed spray case 47. The spray assembly 41 sprays aqueous alkaline solution from above to below inside the spray case 47. In addition, the static electricity atomizer 1B has atomizing electrodes 42 disposed inside the spray case 47 that convert spray from the spray assembly 41 to fine mist via electrostatic action.

Figure 12:
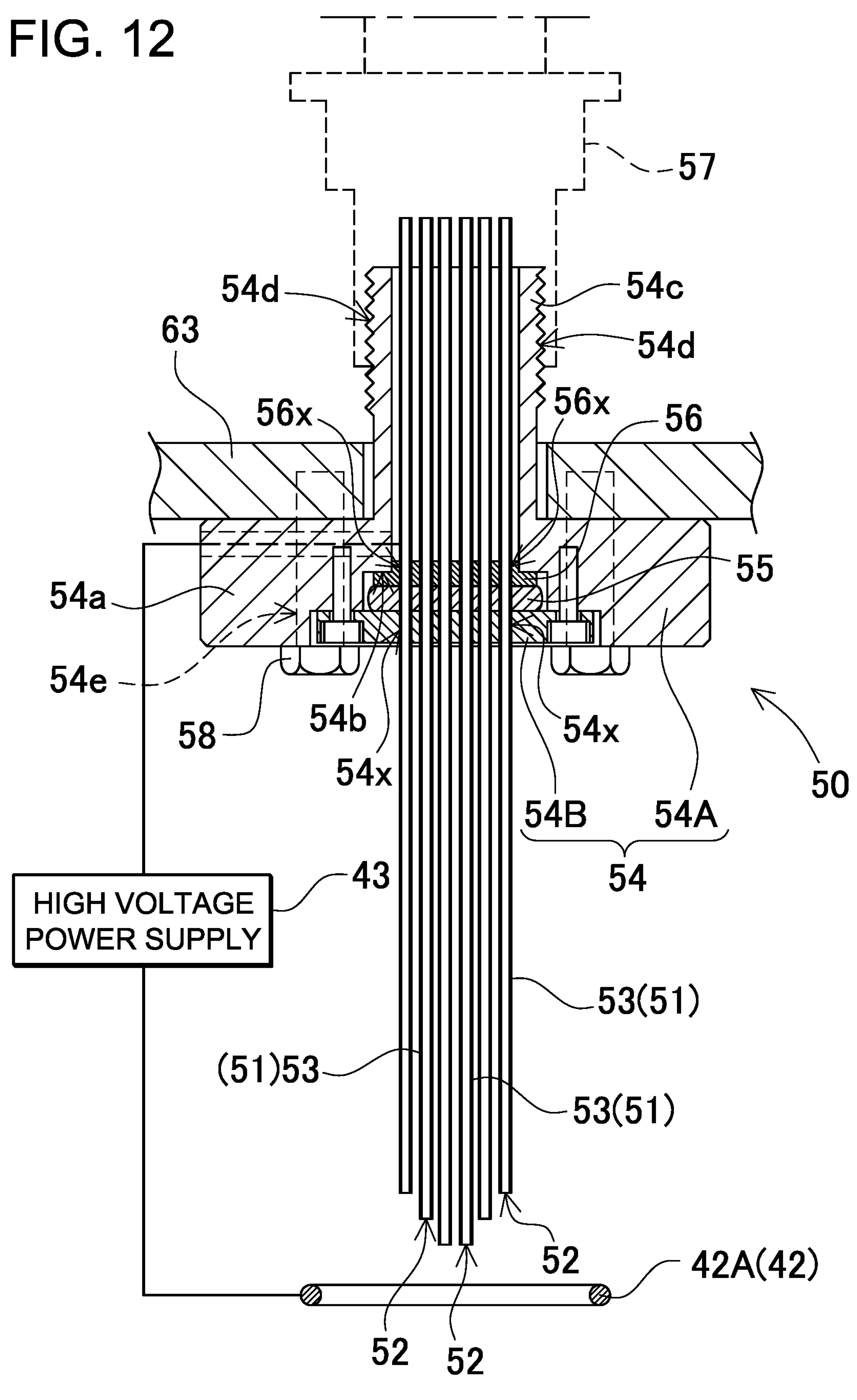
FIG. 12 is an enlarged cross-section showing a mist spray unit of the static electricity atomizer shown in FIG. 11.

The static electricity atomizer 1B shown in FIG. 11 incorporates the spray assembly 41, which is made up of a plurality of nozzle units 50, inside the spray case 47. A nozzle unit 50 is illustrated in FIG. 12. The nozzle unit 50 shown in this figure has a plurality of capillary tubes 53 fixed in parallel orientation within a nozzle block 54. Each capillary tube 53 is a thin metal tube with inside diameter from 0.1 mm to 0.2 mm that ejects aqueous alkaline solution under pressure from the end of the tube to spray the aqueous alkaline solution as a mist.

The nozzle block 54 has a flange region 54*a* inside the outside perimeter and holds a plurality of capillary tubes 53 at its center region. The nozzle block 54 in FIG. 12 has a plate 54B, to which capillary tubes 53 are fixed, bolt-attached to the main body 54A of the nozzle block 54, which includes the flange region 54*a*. The plate 54B is provided with through-holes 54*x* in which the capillary tubes 53 are inserted. Inside diameter of the through-holes 54*x* is approximately equal to the outside diameter of the capillary tubes 53, and the capillary tubes 53 insert into the through-holes 54*x* with minimum clearance. To prevent solution leakage between the capillary tubes 53 and the through-holes 54*x*, a gasket 55 is disposed on the inside surface of the plate 54B. The gasket 55 is flexible rubber-like material that seals gaps between the capillary tubes 53 and the plate 54B in an air-tight manner. A sandwiching plate 56 is disposed to retain the gasket 55 in a compressed state. The gasket 55 is secured to the main body 54A of the nozzle block 54 while being squeezed between the plate 54B and the sandwiching plate 56. The sandwiching plate 56 is also provided with through-holes 56*x*. The sandwiching plate 56 is disposed in a recessed region 54*b* in the main body 54A and is held in place with resilient pressure applied to the gasket 55 by the plate 54B, which is attached to the main body 54A. The main body 54A also has a cylindrical section 54*c* that extends from the backside of the main body 54A. The inside of the cylindrical section 54*c* is configured to house a plurality of capillary tubes 53, and the outside is formed with male threads 54*d*. Capillary tubes 53 are disposed inside the cylindrical section 54*c* of the main body 54A. The aft end of the cylindrical section 54*c* is connected to an aqueous alkaline solution supply socket 57.

The plurality of through-holes 54*x* established in the plate 54B of the nozzle block 54 in FIG. 12 are disposed in the pattern of a plurality of (concentric) rings. The capillary tubes 53 extend out from the nozzle block 54, the ends of the capillary tubes 53 act as static discharge protrusions 51, and openings inside the center of the capillary tubes 53 serve as fine-spray holes 52. The number of fine-spray holes 52 in a nozzle unit 50 is set by the number of capillary tubes 53 in the nozzle block 54. To increase the amount of mist sprayed by a nozzle unit 50 in a given time, the number of fine-spray holes 52 established in a single nozzle unit 50 is preferably greater than or equal to 10, more preferably greater than or equal to 20, and still more preferably greater than or equal to 30 holes. Since too many fine-spray holes 52 make nozzle unit 50 overall size large, less than or equal to 100 fine-spray holes 52 are established. In the nozzle unit 50 shown in FIG. 12, capillary tubes 53 in the center region of the nozzle block 54 protrude outward (downward in FIG. 12) more than capillary tubes 53 in the perimeter region, and a plane passing through the ends of the capillary tubes 53 has a downward pointing conical shape. However, the amount of nozzle unit capillary tube protrusion can also be uniform and the ends of all the capillary tubes can lie in a (flat) horizontal plane.

The nozzle unit 50 described above is provided with numerous thin-tube capillary tubes 53 and aqueous alkaline solution mist is sprayed from each capillary tube 53. However, the nozzle unit can also have a perforated plate (with multiple fine-spray hole openings) in place of the capillary tubes. The perforated plate is fabricated from (electrically) conducting material such as metal. The perforated plate can be sheet metal with fine-spray holes opened via laser pulse. The perforated plate can also sintered metal with fine-spray hole openings. An (electrically) conducting perforated plate can be connected to a high voltage power supply to apply high voltage between the perforated plate and the atomizing electrodes. However, the perforated plate does not necessarily need to be (electrically) conducting material. This is because the aqueous alkaline solution is (electrically) conducting and high voltage can be applied between the atomizing electrodes and aqueous alkaline solution sprayed from the spray holes to electro-statically atomize the sprayed mist. Accordingly, materials such as open-cell plastic foam with fine-spray holes can also be used as the perforated plate.

The spray case 47 is provided with atomizing electrodes 42 that are insulated with respect to the spray assembly 41. High potential is applied to the atomizing electrodes 42 with respect to the spray assembly 41. Accordingly, the atomizing electrodes 42 and spray assembly 41 are attached to the spray case 47 in a mutually insulated configuration. A static electricity atomizer 1B with the spray assembly fixed to the metal spray case without insulation has atomizing electrodes insulated from the spray case. Similarly, a static electricity atomizer 1B with the spray assembly insulated from the spray case has atomizing electrodes fixed to the spray case. However, both the spray assembly and the atomizing electrodes can be fixed to the spray case in an insulated manner.

Electric discharge takes place between atomizing electrodes 42 and static discharge protrusions 51 in the spray assembly 41, and this atomizes mist sprayed from the spray assembly 41 into fine particles. The atomizing electrodes 42 are positioned separated from, and in line with the spray direction of mist from the fine-spray holes 52. The atomizing electrodes 42 in FIGS. 11 and 12 are annular metal rings 42A positioned around nozzle block 54 perimeters, which is around the outside of the plurality of capillary tubes 53 attached to each nozzle block 54. As shown in FIG. 11, metal ring atomizing electrodes 42 are in the flow path of carrier gas (exhaust gas in the fourth embodiment) blown from flow inlets 64, and mist attachment to the atomizing electrodes 42 can be reduced by the carrier gas flow.

In addition, metal mesh can also be used as atomizing electrodes. Metal mesh atomizing electrodes are disposed separated from, and in line with the spray direction of mist from the static discharge protrusions 51. Metal mesh atomizing electrodes can make electric discharge from each static discharge protrusion 51 uniform to atomize mist sprayed from each fine-spray hole 52 into fine particles.

Atomizing electrodes 42 are disposed in front of each nozzle unit 50. Since the spray assembly 41 in the static electricity atomizer 1B of FIG. 11 sprays mist downward, atomizing electrodes 42 are disposed below the nozzle units 50.

The high voltage power supply 43 applies high voltage between the atomizing electrodes 42 and the nozzle units 50. The high voltage power supply 43 is a direct current (DC) power supply with the positive-side connected to the atomizing electrodes 42 and the negative-side connected to the nozzle units 50. However, the positive-side can also be connected to the nozzle units and the negative-side connected to the atomizing electrodes.

In the static electricity atomizer 1B in FIG. 11, the upper part of the spray case 47 is an enclosed chamber that serves as an air chamber 62. An air-tight partition wall 63 is fixed in the upper part of the spray case 47 to partition the air chamber 62. The partition wall 63 divides the interior of the spray case 47 into an air chamber 62 and a spray chamber 61 and also serves as the spray assembly 41 mounting piece that holds the plurality of nozzle units 50 in fixed positions. Spray assembly 41 nozzle units 50 are mounted on the partition wall 63 (mounting piece) with disposition that allows mist to be sprayed into the spray chamber 61. As shown in FIG. 12, nozzle units 50 are mounted on the partition wall 63 (in a manner that allows disconnection) via connecting bolts 58 that pass through connecting holes 54*e* opened through the flange region 54*a* of each nozzle block 54.

The air chamber 62 is an enclosed structure connected with a blower mechanism 67 that supplies air, and carrier gas blown in from the blower mechanism 67 flows through flow inlets 64 opened through the partition wall 63 into the spray chamber 61. The flow inlets 64 are through-holes in the form of slits opened between the nozzle units 50 in a manner that blows carrier gas around each nozzle unit 50. However, the flow inlets are not necessarily slits. A plurality of circular or polygonal shaped through-holes can also be established between nozzle units as flow inlets that blow carrier gas between the nozzle units. Carrier gas blown into the spray chamber 61 from the flow inlets 64 transports the atomized mist. The spray case 47 in FIG. 11 has flow inlets 64 opened between adjacent nozzle units 50. Carrier gas blown from flow inlets 64 into the spray chamber 61 mixes with fine mist particles formed by atomization of spray from the nozzle units 50 by the atomizing electrodes 42, and this forms mist-and-gas mixture, which is supplied to the static mixer 6A.

As shown in FIG. 11, nozzle units 50 are mounted on the spray chamber 61 side of the partition wall 63 and spray mist into the spray chamber 61. The spray assembly 41 is connected to a pump 65 that supplies aqueous alkaline solution under pressure. The pump 65 pressurizes and delivers aqueous alkaline solution 9 retained in a solution tank 66 to the nozzle units 50. The pump 65 filters the aqueous alkaline solution and supplies it to the spray assembly 41. The filter is a filter that removes foreign matter that can clog the spray assembly 41. Making the pump 65 discharge pressure high increases the flow rate of aqueous alkaline solution sprayed from the nozzle units 50 and can reduce average particle diameter of the mist. However, average particle diameter of the mist is not only determined by the pressure of aqueous alkaline solution delivered from the pump 65, but also varies depending on nozzle unit 50 structure. Accordingly, the pressure of aqueous alkaline solution supplied from the pump 65 to the nozzle units 50 is set to an optimum value considering nozzle unit 50 structure and required mist particle diameter, and is set greater than or equal to 0.1 MPa, preferably greater than or equal to 0.2 MPa, and more preferably greater than or equal to 0.3 MPa. If the pressure of aqueous alkaline solution delivered by the pump 65 to the nozzle units 50 is made high, not only is an expensive pump required, but also the motor that drives the pump will have significant power consumption increasing operating cost. Consequently, the pressure of aqueous alkaline solution supplied from the pump 65 to the nozzle units 50 is set, for example, less than or equal to 1 MPa, preferably less than or equal to 0.8 MPa, and more preferably less than or equal to 0.7 MPa. Specifically, pressure of aqueous alkaline solution supplied from the pump 65 to the nozzle units 50 is set between 0.3 MPa and 0.6 MPa, and average particle diameter of the mist is made less than or equal to 50 μm, preferably less than or equal to 30 μm, and greater than or equal to 100 nm.

The method and apparatus for producing carbonate salts of the present invention can be applied advantageously as a method and apparatus that manufactures carbonate salts using (as raw material) carbon dioxide included in exhaust gas emitted from an industrial facility and/or equipment such as a power plant or blast furnace.

REFERENCE SIGNS LIST

100, 200 manufacturing apparatus
1 atomizer
1A ultrasonic atomizer
1B static electricity atomizer
2 atmospheric pollutant pre-processing unit
2A first processing unit
2B second processing unit
3 PM pre-processing unit
4 pre-processing units
5 controller
6 mixer
6A static mixer
7 separator
8 oxidizing unit
9 aqueous alkaline solution
10 atomizing chamber
11 ultrasonic transducer
12 high frequency power supply
13 supply inlet
14 overflow outlet
15 solution supply system
16 solution tank
17 solution pump
18 bottom plate
18A opening
19 lead wire
20 blower mechanism
21 air heater
22 solution heater
24 supply fan
25 duct material
26 element blade
26A right element blade
26B left element blade
27 temperature sensor
28 temperature sensor
29 supply fan
30 electrostatic dust collector
31 discharge electrode
31A positive electrode
31B negative electrode
32 collector electrode
33 power supply
34 switch
35 air (gas) circulation path
41 spray assembly
42 atomizing electrode
42A annular metal ring
43 high voltage power supply
47 spray case
50 nozzle unit
51 static discharge protrusion
52 fine-spray hole
53 capillary tube
54 nozzle block
54A main body (of the nozzle block)
54B plate
54*a* flange region
54*b* recessed region
54*c* cylindrical section
54*d* male thread
54*e* connecting hole
54*x* through-hole
55 gasket
56 sandwiching plate
56*x* through-hole
57 aqueous alkaline solution supply socket
58 connecting bolt
61 spray chamber
62 air chamber
63 partition wall
64 flow inlet
65 pump
66 solution tank
67 blower mechanism
70 cyclone separator
71 cylinder region
72 tapered region
73 inlet duct
74 liquid outlet
75 exhaust duct
76 liquid recovery tank
78 wet scrubber
79 nozzle
80 reacting chamber
81 mixing receptacle
82 drier
W liquid surface
P liquid column
H surface

What is claimed is:

1. A method for producing carbonate salts, the method comprising:

- an atomizing step that forms an aqueous alkaline solution mist with an atomizer;
- a mixing step that mixes exhaust gas with the aqueous alkaline solution mist produced in the atomizing step, absorbs exhaust gas carbon dioxide into the mist, and combines mist positive ions with the carbon dioxide to form mist that contains carbonate salt; and
- a separating step that separates the mist that contains carbonate salt produced in the mixing step from exhaust gas,
- wherein the atomizer ultrasonically vibrates the aqueous alkaline solution to form mist in the atomizing step, and
- wherein the mixing step further comprises detecting a temperature and a humidity and adjusting flow rates of the exhaust gas and the mist with a controller to maintain an internal temperature at or below a dew point to suppress vaporization of the mist.

2. The method for producing carbonate salts as cited in claim 1 wherein the atomizer ultrasonically vibrates the aqueous alkaline solution in the atomizing step to form a column of liquid that protrudes from the liquid surface, and blows exhaust gas over the surface of the liquid column to mix the mist and exhaust gas.

3. The method for producing carbonate salts as cited in claim 1 wherein the atomizer ultrasonically vibrates the aqueous alkaline solution in the atomizing step to form a column of liquid that protrudes from the liquid surface, blows a carrier gas over the surface of the liquid column to form a mist-and-gas mixture, and mixes that mist-gas mixture with exhaust gas in the mixing step.

4. The method for producing carbonate salts as cited in claim 1 wherein caustic soda solution is used as the aqueous alkaline solution in the atomizing step, carbon dioxide in exhaust gas is reacted with the sodium hydroxide solution mist in the mixing step to produce mist containing sodium carbonate, and the mist that contains sodium carbonate is separated from the exhaust gas in the separating step, and the method further comprising a reacting step that reacts sodium carbonate solution obtained in the separating step with an aqueous solution of calcium hydroxide to produce calcium carbonate.

5. The method for producing carbonate salts as cited in claim 4 sodium carbonate solution is mixed with calcium hydroxide to react sodium carbonate and calcium hydroxide to produce calcium carbonate in the reacting step, and the reacting step further comprises a drying step that separates and dries calcium carbonate precipitate obtained in the reacting step.

6. The method for producing carbonate salts as cited in claim 1 wherein caustic soda solution produced from seawater as raw material is used as the aqueous alkaline solution in the atomizing step.

7. The method for producing carbonate salts as cited in claim 1 wherein aqueous alkaline solution mist is mixed with exhaust gas with a mixer in the mixing step, and temperature in the mixer is maintained at or below the dew point.

8. The method for producing carbonate salts as cited in claim 1 further comprising a pre-processing step that separates atmospheric pollutants from the exhaust gas and uses carbon dioxide in the atmospheric pollutant removed exhaust gas as raw material to produce carbonate salts.

9. The method for producing carbonate salts as cited in claim 1 further comprising a pre-processing step that removes particulate matter included in the exhaust gas and uses carbon dioxide in the particulate matter removed exhaust gas as raw material to produce carbonate salts.

* * * * *